(12) United States Patent
Suess et al.

(10) Patent No.: US 11,985,437 B2
(45) Date of Patent: May 14, 2024

(54) READOUT ARCHITECTURES FOR BINNED INDIRECT TIME-OF-FLIGHT SENSORS

(71) Applicant: OMNIVISION TECHNOLOGIES, INC., Santa Clara, CA (US)

(72) Inventors: Andreas Suess, San Jose, CA (US); Zheng Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 416 days.

(21) Appl. No.: 17/517,971

(22) Filed: Nov. 3, 2021

(65) Prior Publication Data

US 2023/0139234 A1 May 4, 2023

(51) Int. Cl.
| | |
|---|---|
| *H04N 25/46* | (2023.01) |
| *G01S 7/481* | (2006.01) |
| *G01S 17/894* | (2020.01) |
| *H04N 25/44* | (2023.01) |
| *H04N 25/441* | (2023.01) |
| *H04N 25/705* | (2023.01) |
| *H04N 25/75* | (2023.01) |

(52) U.S. Cl.
CPC .......... *H04N 25/46* (2023.01); *G01S 7/4816* (2013.01); *G01S 17/894* (2020.01); *H04N 25/44* (2023.01); *H04N 25/441* (2023.01); *H04N 25/705* (2023.01); *H04N 25/75* (2023.01)

(58) Field of Classification Search
None
See application file for complete search history.

(56) References Cited

U.S. PATENT DOCUMENTS

| | | | |
|---|---|---|---|
| 11,770,633 B2 * | 9/2023 | Suess | G01S 17/894 |
| | | | 348/308 |
| 2018/0184053 A1 * | 6/2018 | Engelen | H04N 25/447 |
| 2021/0356597 A1 * | 11/2021 | Hurwitz | H04N 25/75 |
| 2022/0221562 A1 * | 7/2022 | Wang | H04N 25/00 |

OTHER PUBLICATIONS

Bernard Büttgen and Peter Seitz, "Robust Optical Time-of-Flight Range Imaging Base on Smart Pixel Structures," [Online], IEEE Transactions on Circuits and Systems—I: Regular Papers, vol. 55, No. 6, Jul. 2008 [retrieved Oct. 6, 2021 from IEEE Xplore], pp. 1-14.

(Continued)

Primary Examiner — David N Werner
(74) Attorney, Agent, or Firm — Perkins Coie LLP

(57) ABSTRACT

A time-of-flight pixel array includes photodiodes that generate charge in response to incident reflected modulated light. First transfer transistors transfer a first portion of the charge from the photodiodes in response to a first modulation signal and second transfer transistors transfer a second portion of the charge from the photodiodes in response to a second modulation signal, which is an inverted first modulation signal. First floating diffusions are coupled to the first transfer transistors. A binning transistor is coupled between one of the first floating diffusions and another one of the first floating diffusions. A first memory node is coupled to one of the first floating diffusions through a first sample and hold transistor and a second memory node is coupled to another one of the first floating diffusions through a second sample and hold transistor.

42 Claims, 9 Drawing Sheets

(56) References Cited

OTHER PUBLICATIONS

Datasheet—EPC660, "3D TOF imager 320 x 240 pixel," 2019 ESPROS Photonics Corporation, [Online], <https://www.espros.com>, [retrieved Oct. 6, 2021], pp. 1-61.

Andreas Süss, "High Performance CMOS Range Imaging," doctoral dissertation, University Duisburg-Essen, Duisburg, Germany, Feb. 19, 2014, pp. 1-280.

Robert Lange, "3D Time-of-Flight Distance Measurement with Custom Solid-State Image Sensors in CMOS/CCD-Technology," doctoral dissertation, University of Siegen, Siegen, Germany, Jun. 28, 2000, pp. 1-223.

Min-Sun Keel et al., "A 640x480 Indirect Time-of-Flight CMOS Image Sensor with 4-tap 7-um Global-Shutter Pixel and Fixed-Pattern Phase Noise Self-Compensation Scheme," [Online], Samsung Electronics Co., Ltd., 2019 Symposium on VLSI Circuits Digest of Tecnical Papers, [retrieved Oct. 6, 2021], pp. 1-2.

Yuya Shirakawa et al., "An 8-tap CMOS Lock-in Pixel Image Sensor for Short-Pulse Time-of-Flight Measurements," Shizuoka University, R-15, pp. 1-4.

Andrew Payne et al., "A 512x424 CMOS 3D Time-of-Flight Image Sensor with Multi-Frequency Photo Demodulation up to 130MHz and 2GS/s ADC," ISSCC 2014 / SESSION 7 / Image Sensors / 7.6; Microsoft, Mountain View, CA, Feb. 10, 2014, pp. 134-136.

A. Payne et al., "7.6—A 512x424 CMOS 3D Time-of-Flight Image Sensor with Multi-Frequency Photo-Demodulation up to 130MHz and 2GS/s ADC" [Presentation Slides], Microsoft © 2014 IEEE ISSCC: Feb. 10, 2014, pp. 1-23.

Cyrus S. Bamji et al., "1Mpixel 65nm BSI 320MHz Demodulated TOF Image Sensor with 3.5um Global Shutter Pixels and Analog Binning," ISCC 2018 / Session 5 / Image Sensors / 5.8; Microsoft, Mountain View, CA, Feb. 12, 2018, pp. 94-96.

Cyrus S. Bamji et al., "1Mpixel 65nm BSI 320MHz Demodulated TOF Image Sensor with 3.5 μm Global Shutter Pixels and Analog Binning" [Presentation Slides], Microsoft Corp., Mountain View, CA; Paper 5.8: Feb. 12, 2018, pp. 1-26.

\* cited by examiner

READOUT ARCHITECTURES FOR BINNED INDIRECT TIME-OF-FLIGHT SENSORS

BACKGROUND INFORMATION

Field of the Disclosure

This disclosure relates generally to image sensors, and in particular but not exclusively, relates to time-of-flight sensors.

Background

Interest in three dimensional (3D) cameras is increasing as the popularity of 3D applications continues to grow in areas such as imaging, movies, games, computers, user interfaces, facial recognition, object recognition, augmented reality, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the 3D images. In addition, this technique is complex and therefore requires significant computer processing power in order to create the 3D images in real time.

For applications that require the acquisition of 3D images in real time, active depth imaging systems based on time-of-flight measurements are sometimes utilized. Time-of-flight cameras typically employ a light source that directs light at an object, a sensor that detects the light that is reflected from the object, and a processing unit that calculates the distance to the object based on the round-trip time it takes for the light to travel to and from the object.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
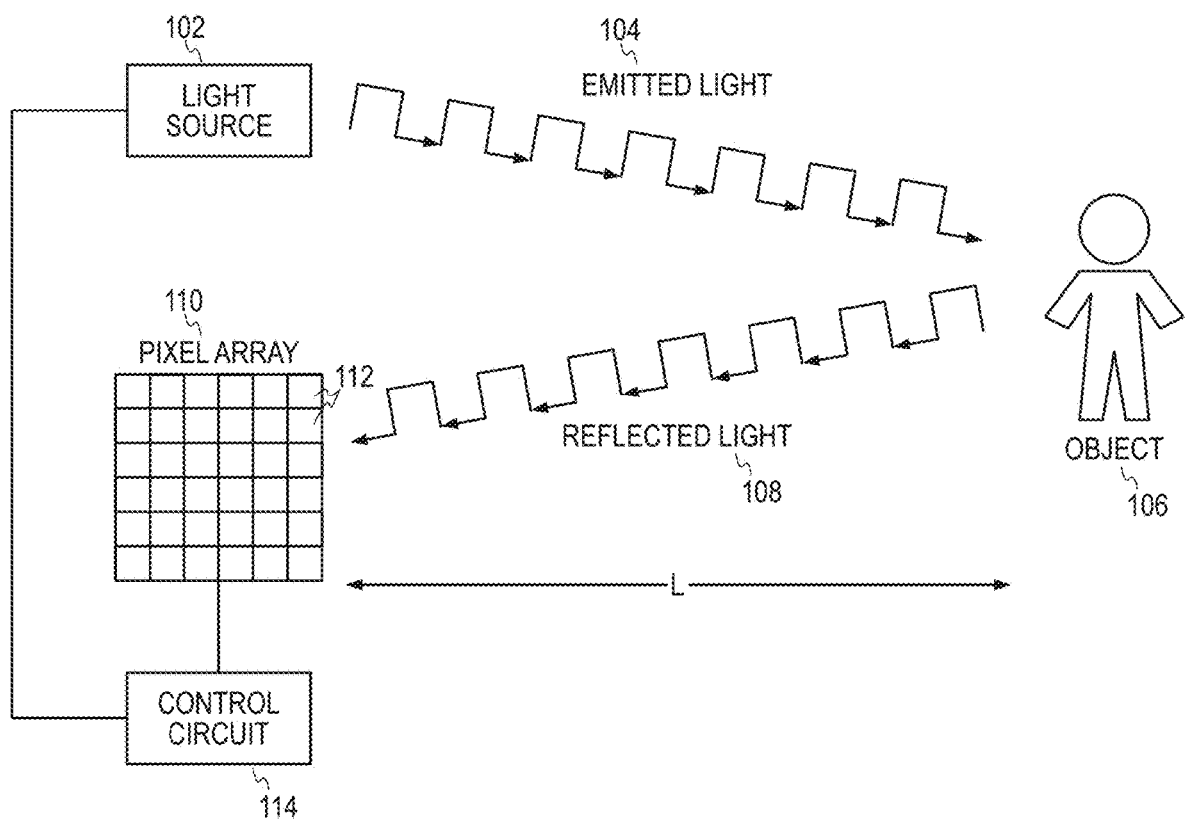
FIG. 1 is a block diagram that shows one example of a time-of-flight light sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to various embodiments of a time-of-flight pixel array including time-of-flight pixel circuits that may be reconfigured in a various example binning arrangements are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of indirect time-of-flight (e.g., iTOF) sensing systems are disclosed in which modulated light is emitted from a light source to an object, which is then reflected from the object back to a time-offlight pixel array included in the time-of-flight sensing system. The object distance is determined in response to the measured phase of the modulation sensed by the time-of-flight pixel circuits, which may be used to yield a 3D frame.

In various examples, each photodiode of each time-of-flight pixel circuit is coupled via a plurality of transfer transistors to a plurality of respective floating diffusions. In the various examples, each of the floating diffusions may be coupled to a first one of a plurality of memory nodes through a respective sample and hold transistor. In the various examples, each of the floating diffusions may also be configured to be coupled to a second one of the plurality of memory nodes through a binning transistor and through another sample and hold transistor. As such, in various examples, each of the plurality of memory nodes may be configured to sample and hold a portion of charge information from multiple photodiodes, which enables the binning of charge information from the multiple photodiodes in accordance with the teachings of the present invention.

In the various examples, the plurality of memory nodes can be read out through respective readout transistors that are coupled to output source follower transistors, which are coupled to respective bitlines. In various examples, two readout transistors are coupled to the output source follower transistor of each time-of-flight pixel circuit. As such, in various examples, both of the readout transistors that are coupled to the output source follower transistor may also be configured to be turned ON (e.g., activated) at the same time, which enables the binning of charge information that is sampled and held in the multiple memory nodes at the output source follower transistor from respective photodiodes in accordance with the teachings of the present invention.

In the various examples, the signals that are on the bitlines may also be configured to be combined, which enables the binning of the signals on that are carried on the respective bitlines. In various examples, the signals that are on the bitlines may be combined using a variety of techniques such as for example coupling multiple row select transistors in different rows of the pixel array to the same bitline to realize vertical binning, coupling together multiple bitlines from different columns or charge sharing of sampled signals on column level of the pixel array to realize horizontal binning, summation of the input signals of an analog to digital converter (ADC) or in digital domain, etc.

To illustrate, FIG. 1 is a block diagram that shows one example of a time-of-flight light sensing system 100 in accordance with the teachings of the present invention. In the depicted example, time-of-flight light sensing system 100 is a 3D camera that calculates image depth information of a scene (e.g., object 106) based on indirect time-of-flight (e.g., iToF) measurements with an image sensor that includes pixel array 110. In some examples, it is appreciated that although time-of-flight light sensing system 100 is capable of sensing 3D images, time-of-flight light system 100 may also be utilized to capture 2D images. In various examples, time-of-flight light sensing system 100 may also be utilized to capture high dynamic range (HDR) images.

As shown in the depicted example, time-of-flight light sensing system 100 includes light source 102 that is synchronized with a time-of-flight sensor that includes a pixel array 110, which includes a plurality of pixel circuits 112, and a control circuit 114 that is coupled to control and synchronize the pixel array 110 and light source 102.

As illustrated, light source 102 is configured to emit light 104 to the object 106 over a distance L. The emitted light 104 is then reflected from the object 106 as reflected light 108 (e.g., reflected light waves/pulses), some of which propagates towards the pixel array 110 of time-of-flight light sensing system 100 over the distance L and is incident upon the pixel circuits 112 of pixel array 110 as image light. Each pixel circuit 112 included in the pixel array 110 includes a photodetector (e.g., one or more photodiodes, avalanche photodiodes, or single-photon avalanche diodes, or the like) to detect the reflected light 108 and convert the reflected light 108 into an electric signal (e.g., electrons, image charge, etc.).

It is noted that pixel array 110 and control circuit 114 are represented as separate components in FIG. 1 for explanation purposes. However, it is appreciated that pixel array 110 and components of control circuit 114 may be integrated onto a same integrated circuit chip or wafer in a non-stacked standard planar sensor. In various examples, it as also appreciated that pixel array 110 may implemented in a stacked time-of-flight image sensor.

Continuing with the depicted example, each pixel circuit 112 of pixel array 110 determines depth information for a corresponding portion of object 106 such that a 3D image of object 106 can be generated. As will be discussed in greater detail below, depth information is determined by modulating the transfer gates of each pixel circuit 112 with 0°/180° and 180°/0° phase modulation signals as well as with opposing 90°/270° and 270°/90° phase modulation signals in multiple subframes to measure the delay/phase difference between emitted light 104 and the received reflected light 108 to indirectly determine a round-trip time for light to propagate from light source 102 to object 106 and back to the pixel array 110 of time-of-flight light sensing system 100. In the various example, the 0°, 90°, 180°, and 270° phase modulation signals may also be modulated at multiple different frequencies in the multiple subframes. In various examples, each of a plurality of memory nodes included in each pixel circuit 112 is capable of capturing and storing a subframe of a phase portion of charge information from the photodiode included the pixel circuit 112 during or prior to a readout of another memory node storing another phase portion of charge information acquired in a previous subframe. Thus, the depth information may be based on electric signals generated by the photodiode included in each pixel circuit 112, which are subsequently transferred and stored in the plurality of memory nodes in each pixel circuit 112, which are then read out subsequently.

As shown in the depicted example, the round-trip time for emitted light 104 to propagate from light source 102 to object 106 and then be reflected back to pixel array 110 can be used to determine the distance L using the following relationships in Equations (1) and (2) below:

$$T_{TOF} = \frac{2L}{c} \quad (1)$$

$$L = \frac{T_{TOF} \cdot c}{2} \quad (2)$$

where c is the speed of light, which is approximately equal to $3 \times 10^8$ m/s, and $T_{TOF}$ corresponds to the round-trip time, which is the amount of time that it takes for the light to travel to and from the object 106 as shown in FIG. 1. Accordingly, once the round-trip time is known, the distance L may be calculated and subsequently used to determine depth information of object 106.

As shown in the depicted example, control circuit 114 is coupled to pixel array 110 and light source 102, and includes logic and memory that when executed causes time-of-flight light sensing system 100 to perform operations for determining the round-trip time. Determining the round-trip time may be based on, at least in part, timing signals generated by control circuit 114. For indirect time-of-flight (indirect time-of-flight) measurements, the timing signals are representative of the delay/phase difference between the light waves/pulses of when the light source 102 emits light 104 and when the photodetectors or photodiodes in pixel circuits 112 detect the reflected light 108.

In some examples, time-of-flight light sensing system 100 may be included in a device (e.g., a mobile phone, a tablet, a camera, etc.) that has size and power constraints determined, at least in part, based on the size of the device. Alternatively, or in addition, time-of-flight light sensing system 100 may have specific desired device parameters such as frame rate, depth resolution, lateral resolution, etc.

Figure 2:
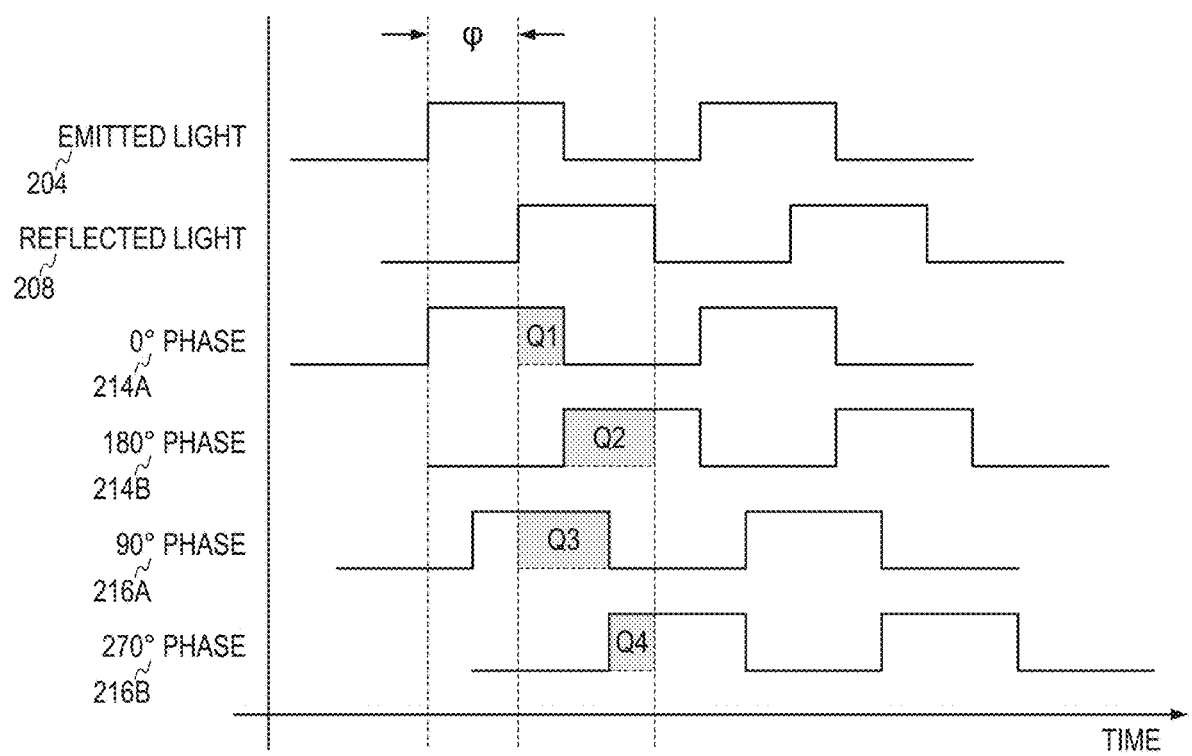
FIG. 2 is a timing diagram that shows an example of light pulses emitted from a light source relative to the receipt of the reflected light pulses and measurements using various phase shifts in an example time-of-flight sensing system accordance with the teachings of the present invention.

FIG. 2 is a timing diagram that illustrates the timing relationship between example light pulses emitted from a light source relative to the receipt of the reflected light pulses and measurements using various phase shifts in an example time-of-flight imaging system accordance with the teachings of the present invention. Specifically, FIG. 2 shows emitted light 204, which represents the modulated light pulses that are emitted from the light source 102 to the object 106, and corresponding pulses reflected light 208, which represents the reflected light pulses that are back-reflected from the object 106 and received by the pixel circuits 112 pixel array 110 of FIG. 1.

The example depicted in FIG. 2 also illustrates measurement pulses of the phase modulation signals including a 0° phase modulation signal 214A (e.g., a first phase modulation signal) and a 180° phase modulation signal 214B (e.g., a second phase modulation signal), as well as measurement pulses including a 90° phase modulation signal 216A (e.g., a third phase modulation signal) and a 270° phase modulation signal 216B (e.g., a fourth phase modulation signal), which as shown are all phase-shifted relative to the phase of the pulses of emitted light 204. In addition, it is appreciated that in the depicted example the 180° phase modulation signal 214B is an inverted 0° phase modulation signal 214A, that the 90° phase modulation signal 216A is ninety degrees out of phase with the 0° phase modulation signal 214A, and that the 270° phase modulation signal 216B is an inverted 90° phase modulation signal 216A.

FIG. 2 also shows that the 0° phase modulation signal 214A and 180° phase modulation signal 214B, as well as the 90° phase modulation signal 216A and 270° phase modulation signal 216B pulses are all modulated at the same frequency as the modulated emitted light 204 and reflected light 208 to realize homodyne detection of the reflected light 208 in accordance with the teachings of the present invention. In various examples, the modulation frequency of the phase modulation signals and the modulated emitted light may be varied across the multiple subframes in which the phase is measured. It is appreciated that the measurements at additional frequencies and/or phases can improve systematic errors, such as for example harmonic distortions and/or multipath artifacts. Utilizing the different phases for the example measurement pulses as shown allows reconstruction of the encoded distance in multiple subframes in accordance with the teachings of the present invention.

As will be discussed, the 0° phase modulation signal 214A and 180° phase modulation signal 214B, as well as the 90° phase modulation signal 216A and 270° phase modulation signal 216B pulses correspond to the switching or modulation of transfer transistors that are included in the pixel circuits 112 of pixel array 110. In operation, the modulation of the transfer transistors in the pixel circuits 112 of pixel array 110 can be used to measure the charge that is photogenerated in the one or more photodiodes that are included the pixel circuits 112 in response to the reflected light 208 to measure the delay or phase difference φ between the pulses of emitted light 204 and the corresponding pulses of reflected light 208.

For instance, the example illustrated in FIG. 2 shows that a first phase portion of charge Q1 is photogenerated by the pulses of 0° phase modulation signal 214A and that a second phase portion of charge Q2 is photogenerated by the pulses of 180° phase modulation signal 214B in response to reflected light 208. Similarly, a third phase portion of charge Q3 is photogenerated by the pulses of 90° phase 216A and a fourth phase portion of charge Q4 is photogenerated by the pulses of 270° phase modulation signal 216B in response to reflected light 208. As will be discussed in greater detail below, the measurements of four phase portions of charge Q1, Q2, Q3, and Q4 can then be used to determine the delay or phase difference φ between the emitted light 204 and the reflected light 208, and therefore the time of flight $T_{TOF}$ of light from the light source 102 to the object 106 and then back to the pixel array 110 in accordance with the teachings of the present invention.

Figure 3:
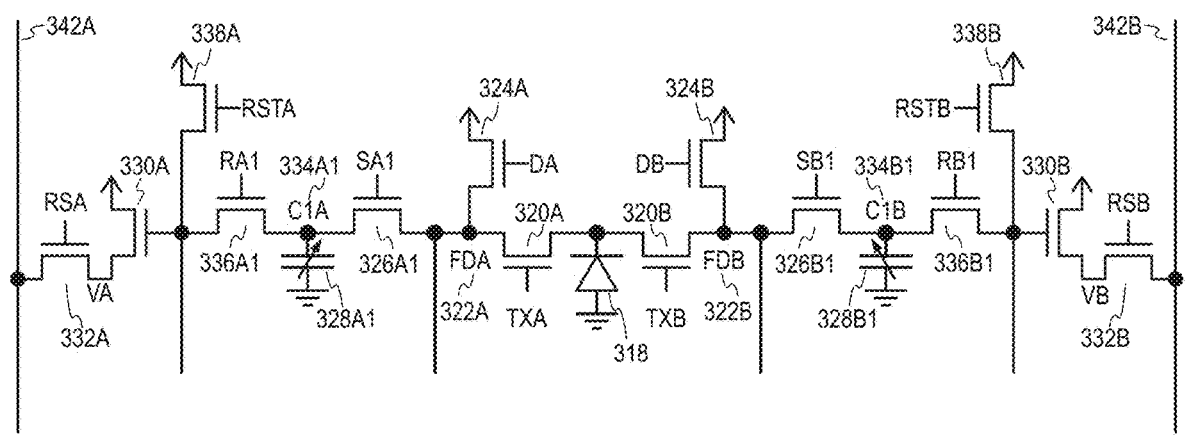
FIG. 3 is a schematic illustrating an example of a portion of a time-of-flight pixel circuit including one photodiode in accordance with the teachings of the present invention.

FIG. 3 is a schematic illustrating one example of a portion of a time-of-flight pixel circuit 312 in accordance with the teachings of the present invention. It is appreciated that the pixel circuit 312 of FIG. 3 may be an example of a portion of one of the pixel circuits 112 included in pixel array 110 shown in FIG. 1, and that similarly named and numbered elements described above are coupled and function similarly below.

As shown in the example portion depicted in FIG. 3, pixel circuit 312 includes a photodiode 318 configured to photogenerate charge in response to incident light. In one example, the light that is incident on photodiode 318 is the reflected modulated light 108 that is reflected from an object 106 as described in FIG. 1. A first floating diffusion FDA 322A is configured to store a first portion of charge photogenerated in the photodiode 318, and second floating diffusion FDB 322B is configured to store a second portion of charge photogenerated in the photodiode 318. As will be discussed in greater detail below, in various examples, first floating diffusion FDA 322A and second floating diffusion FDB 322B may be coupled to other respective floating diffusions via respective binning transistors to provide reconfigurable binning for pixel circuit 312 in accordance with the teachings of the present invention.

In one example, a first reset transistor 324A is coupled between a supply rail and the first floating diffusion FDA 322A. A second reset transistor 324B is coupled between the supply rail and the second floating diffusion FDB 322B. In the various examples, the first reset transistor 324A is configured to reset the first floating diffusion FDA 322A in response to a first reset signal DA and the second reset transistor 324B is configured to reset the second floating diffusion FDB 322B in response to a second reset signal DB. In various examples, the first reset signal DA and second reset signal DB may be the same signal or different signals. In one example, the first reset transistor 324A and second reset transistor 324B may also act as overflow transistors. In such examples, the first reset transistor 324A and second reset transistor 324B may be operated in such a way that excess carriers generated by photodiode 318 may be guided to the power supply by first reset transistor 324A and/or the second reset transistor 324B or in a way such that the photosensitivity of photodiode 318 is disabled.

A first transfer transistor 320A is configured to transfer the first portion of charge from the photodiode 318 to the first floating diffusion FDA 322A in response to a first modulation signal TXA. In one example, the first modulation signal TXA may be an example of one of the phase modulation signals described in FIG. 2. A second transfer transistor 320B is configured to transfer the second portion of charge from the photodiode 318 to the second floating diffusion FDB 322B in response to a second modulation signal TXB. In the example, the second modulation signal TXB may also be an example of one of the phase modulation signals described in FIG. 2.

As shown in the depicted example, pixel circuit 312 also includes a first capacitor 328A1, which provides a first memory nodes C1A 334A1. In the example, pixel circuit 312 also includes a second capacitor 328B1, which provides a second memory node C1B 334B1. In the example, a first sample and hold transistor 326A1 is coupled between the first floating diffusion FDA 322A and the first memory nodes C1A 334A1 as shown. Similarly, a second sample and hold transistor 326B1 is coupled between the second floating diffusion FDB 322B and the second memory node C1B 334B1 as shown.

As shown in the depicted example, pixel circuit 312 further includes a first source follower transistor 330A and a second source follower transistor 330B. In the depicted example, a first output reset transistor 338A is coupled to the gate of first source follower transistor 330A and a second output reset transistor 338B is coupled to the gate of second source follower transistor 330B. In operation, the first and second output reset transistors 338A and 338B may be activated in response to output reset signals RSTA and RSTB to reset or precharge the gates of the first and second source follower transistors 330A and 330B between readouts. In various examples, the output reset signals RSTA and RSTB may be the same signal or independent signals.

In the depicted example, a first readout transistor 336A1 is coupled between the first memory node C1A 334A1 and a gate of the first source follower transistor 330A. A second readout transistor 336B1 is coupled between the second memory node C1B 334B1 and a gate of the second source follower transistor 330A. As will be discussed in greater detail below, in various examples, the gate of the first source follower transistor 330A and the gate of the second source follower transistor 330B may be coupled to other respective readout transistors to provide reconfigurable binning for pixel circuit 312 in accordance with the teachings of the present invention.

A first row select transistor 332A is coupled between the first readout transistor 336A1 and the first source follower transistor 330A and a first bitline 342A, and a second row select transistor 332B is coupled between the second readout transistor 336B1 and the second source follower transistor 330B and a second bitline 342B. In one example, the output of the first row select transistor 332A may be considered a first tap of the pixel circuit 312 from which the output VA from first source follower transistor 330A may be read out through first bitline 342A, and the output of the second row select transistors may be considered a second tap of the pixel circuit 312 from which the output VB from second source follower transistor 330B may be read out through second bitline 342B.

In operation, the first modulation signal TXA and second modulation signal TXB that are configured to modulate the first transfer transistor 320A and the second transfer transistor 320B are modulation signals that are 180° out of phase or inverted versions of each other. For instance, in one example, in a first subframe, the first modulation signal TXA may be the 0° phase modulation signal 214A while the second modulation signal TXA is therefore the 180° phase modulation signal 214B. In that example, in another subframe, the first modulation signal TXA and the second phase modulated signal TXB are inverted relative to their respective signals in the first subframe. In other words, in that example, in the other subframe, the first modulation signal TXA is the 180° phase modulation signal 216B while the second modulation signal TXB is the 0° phase modulation signal 214A. In the various examples, it is appreciated that the first and second transfer transistors 320A and 320B may also be modulated with 90°/270° phase modulation signals as well as with the opposing phases of 270°/90° phase modulation signals in multiple subframes.

By modulating the first transfer transistor 320A and the second transfer transistor 320B with the first modulation signal TXA and second modulation signal TXB with the opposing phases of the 0°/180° and 180°/0° phase modulations signals as well as with the opposing phases of the 90°/270° and 270°/90° phase modulation signals in the multiple subframes as described, offset errors as well as dark current errors in the time-of-flight pixel circuits are canceled or removed in accordance with the teachings of the present invention.

In the various examples, the first modulation signal TXA and second modulation signal TXB may also be modulated at different phases and/or frequencies in different subframes, which improves systematic errors, such as for example harmonic distortions or multipath artifacts in accordance with the teachings of the present invention. For instance, in one example, the first modulation signal TXA and second modulation signal TXB are configured to alternate between two different modulation frequencies f1 and f2 for each subframe. In other words, in one example, the first modulation signal TXA and second modulation signal TXB are configured to be modulated at a modulation frequency f1 during a first subframe, and then a modulation frequency f2 during a second subframe. Then, in a third subframe, the first modulation signal TXA and second modulation signal TXB are configured to be modulated at the modulation frequency f1, and then in a fourth subframe, the first modulation signal TXA and second modulation signal TXB are configured to be modulated at the modulation frequency f2, and so on.

Figure 4:
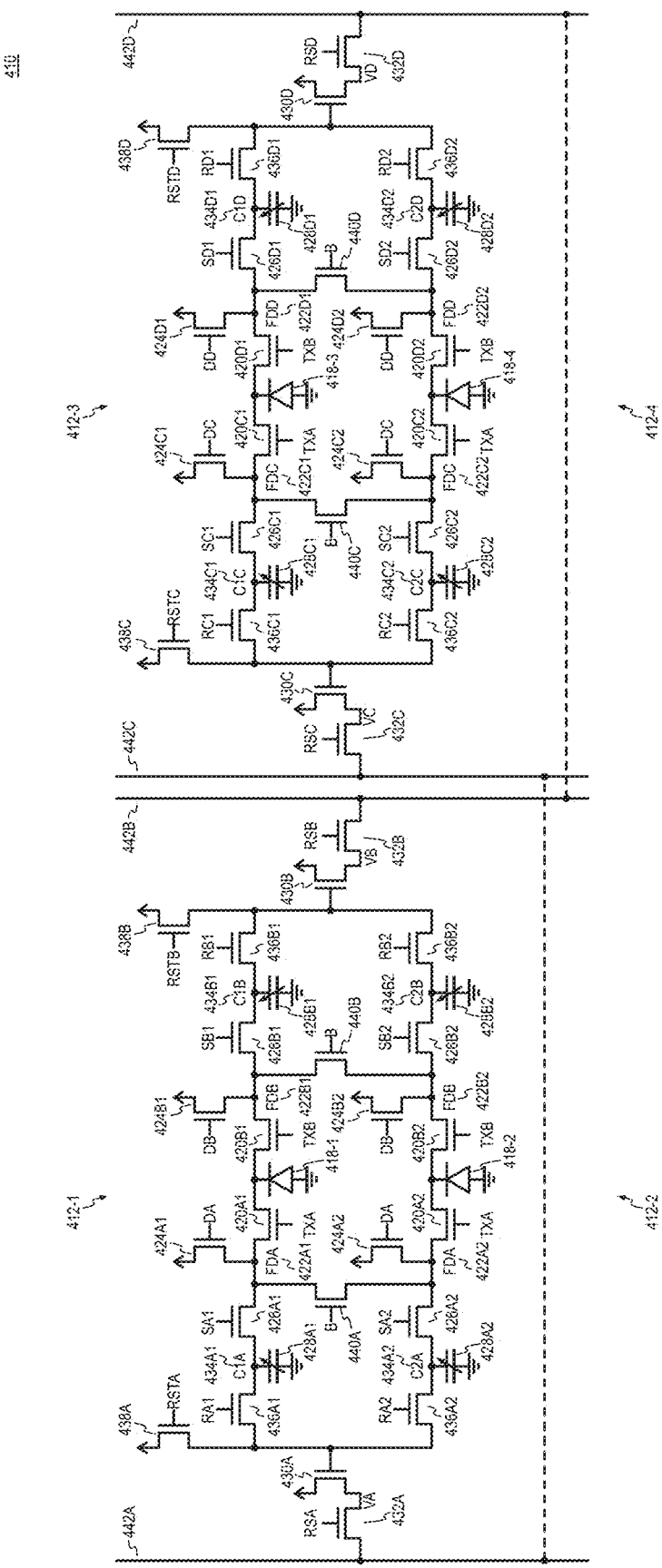
FIG. 4 is a schematic illustrating an example of a time-of-flight pixel array including examples of time-of-flight pixel circuits that include four photodiodes with a reconfigurable binning readout architecture in accordance with the teachings of the present invention.

FIG. 4 is a schematic illustrating an example of a time-of-flight pixel array 410 including examples of time-of-flight pixel circuits that include two photodiodes with a reconfigurable binning readout architecture in accordance with the teachings of the present invention. It is appreciated that the example of time-of-flight pixel circuits illustrated in the pixel array 410 FIG. 4 share many similarities with the portion of the time-of-flight pixel circuit 312 shown in FIG. 3, and/or may be an example of the time-of-flight pixel circuits 112 shown in FIG. 1, and that similarly named and numbered elements described above are coupled and function similarly below.

In the example depicted in FIG. 4, a pixel circuit on the left hand side includes an upper portion of a pixel circuit 412-1 and a lower portion of a pixel circuit 412-2 and a pixel circuit on the right hand side includes an upper portion of a pixel circuit 412-3 and a lower portion of a pixel circuit 412-4. In the example, it is appreciated that each of the portions of pixel circuits 412-1, 412-2, 412-3, 412-4 are substantially similar to the portion of pixel circuit 312 illustrated in FIG. 3, and will therefore not be described in detail for the sake of brevity. One of the differences, however, between the example illustrated in FIG. 4 and the example illustrated in FIG. 3 is that the portions of pixel circuits 412-1 and 412-2 in FIG. 4 share a first output reset transistor 438A, a first output source follower transistor 430A, and a first row select transistor 432A at the output tap coupled to first bitline 442A. In addition, pixel circuits 412-1 and 412-2 also share a second output reset transistor 438B, a second output source follower transistor 430B, and a second row select transistor 432B at the output tap coupled to second bitline 442B. Similarly, the portions of pixel circuits 412-3 and 412-4 also share a respective first output reset transistor 438C, a first output source follower transistor 430C, and a first row select transistor 432C at the output tap coupled to a respective first bitline 442C, and a respective second output reset transistor 438D, a second output source follower transistor 430D, and a second row select transistor 432D at the output tap coupled to respective second bitline 442D.

As such, it is appreciated that the photodiode 418-1 and the photodiode 418-2 of pixel circuit portions 412-1 and 412-2 form a 2×1 arrangement from which non-binned outputs may be read out individually in one configuration from each photodiode 418-1 and 418-2 through respective readout transistors 436A1/436B1, 436A2/436B2 of pixel circuit portions 412-1 and 412-2 and the respective output taps coupled to first and second bitlines 442A and 442B. Similarly, the photodiode 418-3 and the photodiode 418-4 of pixel circuit portions 412-3 and 412-4 also form a 2×1 arrangement from which non-binned outputs may be read out individually from each photodiode 418-3 and 418-4 through respective readout transistors 436C1/436D1, 436C2/436D2 of pixel circuit portions 412-3 and 412-4 of pixel circuit portions 412-3 and 412-4 and the respective output taps coupled to the respective first and second bitlines 442C and 442D.

The example depicted in FIG. 4 also illustrates that a first binning transistor 440A is coupled between the first floating diffusion FDA 422A1 of the upper portion of the pixel circuit 412-1 and the first floating diffusion FDA 422A2 of the lower portion of the pixel circuit 412-2. A second binning transistor 440B is coupled between the second floating diffusion FDB 422B1 of the upper portion of the pixel circuit 412-1 and the second floating diffusion FDB 422B2 of the lower portion of the pixel circuit 412-2. Similarly, a respective first binning transistor 440C is coupled between the first floating diffusion FDC 422C1 of the upper portion of the pixel circuit 412-3 and the first floating diffusion FDC 422C2 of the lower portion of the pixel circuit 412-4. A respective second binning transistor 440D is coupled between the second floating diffusion FDD 422D1 of the upper portion of the pixel circuit 412-3 and the second floating diffusion FDD 422D2 of the lower portion of the pixel circuit 412-4.

Therefore, in another configuration, the first and second binning transistors 440A/440C and 440B/440D may be turned ON, which couple together the first floating diffusions FDA 422A1/422A2 and FDC 422C1/422C2 and second floating diffusions FDB 422B1/422B2 and FDD 422D1/422D2. As such, the portions of charge that are transferred from the photodiodes 418-1 and 418-2, as well as the portions of charge that are transferred from photodiodes 418-3 and 418-4 are combined or binned in-pixel in the respective first floating diffusions FDA 422A1/422A2 and FDC 422C1/422C2 and second floating diffusions FDB 422B1/422B2 and 422D1/422D2 in accordance with the teachings of the present invention. In the various examples, the binned signals may then be read out from the respective first floating diffusions FDA 422A1/422A2 and FDC 422C1/ 422C2 and second floating diffusions FDB 422B1/422B2 and 422D1/422D2 through any one of the respective memory nodes 434A1/434A2, 434B1/434B2 and 434C1/ 434C2, 434D1/434D2, corresponding readout transistors 436A1/436A2, 436B1/436B2 and 436C1/436C2, 436D1/ 436D2, and corresponding output tap. In this configuration, 2×1 binning of the signals from photodiodes 418-1/418-2 and/or 418-3/418-4 is realized in accordance with the teachings of the present invention.

In yet another configuration, the binning transistors may be turned OFF (e.g., deactivated), but both readout transistors 436A/436A2, 436B1/436B2, 436C1/436C2, or 436D1/ 436D2 per output tap may be turned ON simultaneously during a readout, which enables the binning of charge information that is sampled and held in the multiple memory nodes C1A/C2A, C1B/C2B, C1C/C2C, or C1D/C2D to be combined or binned in-pixel at the respective gate terminals of the respective output source follower transistors 430A/ 430B or 430C/430D in accordance with the teachings of the present invention. Thus, in this configuration, 2×1 binning of the signals from photodiodes 418-1/418-2 and/or 418-3/ 418-4 is also realized in accordance with the teachings of the present invention.

In still another configuration, the signals that are on the bitlines 442A, 442B, 442C, 442D may also be configured to be combined, which enables the binning of the signals on that are carried on the respective bitlines 442A, 442B, 442C, 442D. For instance, in an example in which pixel circuit portions 412-1, 412-2, 412-3, 412-4 are arranged in the same row of pixel array 410, first bitlines 442A and 442C and second bitlines 442B and 442D may be combined or coupled together, as indicated with the dashed-line in FIG. 4, to combine or horizontally bin the signals that are on the bitlines 442A, 442B, 442C, 442D. In this configuration, if non-binned signals corresponding to photodiode 418-1 and 418-3, or if non-binned signals corresponding to photodiode 418-2 and 418-4, are being output to the bitlines 442A, 442B, 442C, 442D, then 1×2 binning of the signals from photodiodes 418-1/418-3 or 418-2/418-4 is also realized in accordance with the teachings of the present invention. Similarly, in this configuration, if binned signals corresponding to photodiode 418-1/418-2 and 418-3/418-4 are being output to the bitlines 442A, 442B, 442C, 442D, then 2×2 binning of the signals from photodiodes 418-1/418-3 or 418-2/418-4 is also realized in accordance with the teachings of the present invention.

In yet another configuration, in an example in which pixel circuit portions 412-1, 412-2, 412-3, 412-4 are arranged in the same column of pixel array 410, first bitlines 442A and 442C are the same bitline, and second bitlines 442B and 442D are the same bitline, which may also be with the dashed-line in FIG. 4, to combine or average or vertically bin the signals that are received on the bitlines 442A/442C and 442B/442D. In this arrangement, if binned signals corresponding to photodiodes 418-1/418-2 and 418-3/418-4 are being output to the bitlines 442A/442C and 442B/442D, then 1×4 binning of the signals from photodiodes 418-1/ 418-2 and 418-3/418-4 is also realized in accordance with the teachings of the present invention.

Therefore, in various examples, the signals that are on the bitlines may be combined using a variety of techniques such as for example coupling multiple row select transistors in different rows of the pixel array to the same bitline to realize vertical binning, or coupling together multiple bitlines from different columns or charge sharing of sampled signals at the column level of the pixel array to realize horizontal binning, or summing together the signals as input signals to an analog to digital converter (ADC), or combining the signals in digital domain, etc.

FIGS. 5A-5E are timing diagrams illustrating signals in an example time-of-flight sensing system in various different example binning configurations in accordance with the teachings of the present invention. It is appreciated that the signals illustrated in FIGS. 5A-5E may be examples of signals found in example time-of-flight pixel circuits (e.g., 412-1/412-2) as shown in FIG. 4 or in a time-of-flight sensing system 100 as shown in FIG. 1, and that similarly named and numbered elements described above are coupled and function similarly below. In the examples described below, some corresponding elements from FIG. 4 may therefore be referred to for explanation purposes.

Figure 5A:
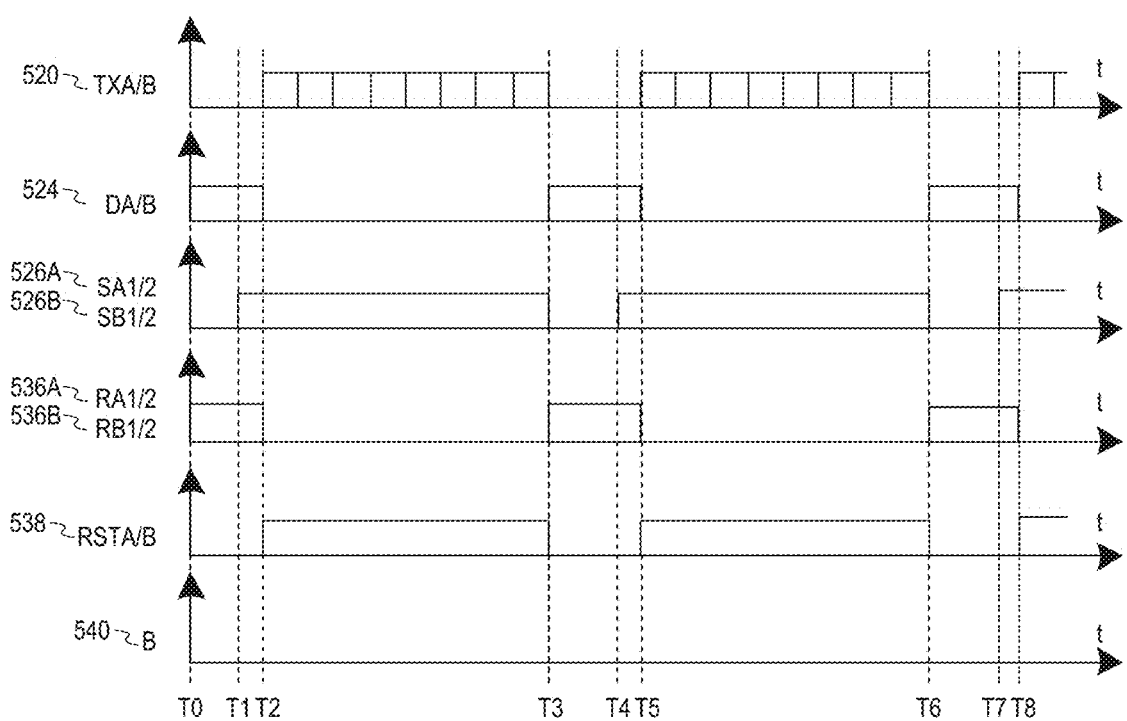
FIGS. 5A-5E are timing diagrams illustrating signals in an example time-of-flight sensing system in various different example binning configurations in accordance with the teachings of the present invention.

For instance, the timing diagram depicted in FIG. 5A illustrates an example of a time-of-flight sensing system that is configured for binning and no pipelining of integration and readout operations. In the example, the binning signal B 540 is deactivated such that the binning transistors are deactivated. However, as shown at time T0, readout signals RA1/2 536A and RB1/2 536B are activated and sample and hold signals SA1/2 526A and SB1/2 526B are deactivated. As such, with both readout transistors controlled by the readout signals RA1/2 536A and RB1/2 536B turned ON simultaneously, a binned readout period occurs during which the charges that are sampled and held in both memory nodes C1A/C2A and C1B/C2B are combined or binned in-pixel at the gate terminals of the respective output source follower transistors (e.g., 430A/430B). As such, it is appreciated that the readout of the charges from the photodiodes (e.g., 418-1/418-2 or 418-3/418-4) are binned. At the same time, the sample and hold transistors controlled with sample and hold signals SA1/2 526A and SB1/2 526B are deactivated. Thus, the reset signals DAB 524 are activated to reset the floating diffusions FDA/FDB while the modulation signals TXA/B 520 are also deactivated.

With the floating diffusions FDA/FDB reset by reset signals DAB 524, the sample and hold signals SA1/2 526A and SB1/2 526B are activated at time T1. At time T2, an integration period begins with the modulation signals TXA/B 520 activated, the reset signals DAB 524 deactivated, and the sample and hold signals SA1/2 526A and SB1/2 526B activated. During the integration period, the charges photogenerated in the photodiodes are sampled and held into the memory nodes C1A/C2A and C1B/C2B in response to the modulation signals TXA/B 520. As mentioned, no pipelined operation occurs in the example depicted in FIG. 5A, and as such, the readout signals RA1/2 536A and RB1/2 536B are deactivated during the integration periods such that no readout operations occur during integration periods. In addition, the output reset signals RSTA/B 538 are also activated at time T2 to reset or precharge the gate terminals of the output source follower transistors while no readout operation occurs.

At time T3, another readout period begins as the integration period ends. As such, the modulation signals TXA/B 520 are deactivated, the reset signals DAB 524 are activated, the sample and hold signals SA1/2 526A and SB1/2 526B are deactivated, the readout signals RA1/2 536A and RB1/2 536B are activated, and the output reset signals RSTA/B 538 are deactivated as shown. Similar to the readout operation that occurred at time T0, both readout signals RA1/2 536A and RB1/2 536B are activated simultaneously, such that a binned readout period occurs during which the charges that are sampled and held in both memory nodes C1A/C2A and C1B/C2B are combined or binned in-pixel at the gate terminals of the respective output source follower transistors (e.g., 430A/430B).

With the floating diffusions FDA/FDB reset by reset signals DAB 524, the sample and hold signals SA1/2 526A and SB1/2 526B are activated at time T4. At time T5, another integration period begins with the modulation signals TXA/B 520 activated, the reset signals DAB 524 deactivated, and the sample and hold signals SA1/2 526A and SB1/2 526B activated. During the integration period, the charges photogenerated in the photodiodes (e.g., 418) are sampled and held into the memory nodes C1A/C2A and C1B/C2B in response to the modulation signals TXA/B 520. The readout signals RA1/2 536A and RB1/2 536B are deactivated such that no readout operation occurs. In addition, the output reset signals RSTA/B 538 are also activated at time T5 to reset or precharge the gate terminals of the output source follower transistors while no readout operation occurs.

At time T6, another readout period begins as the integration period ends. As such, the modulation signals TXA/B 520 are deactivated, the reset signals DAB 524 are activated, the sample and hold signals SA1/2 526A and SB1/2 526B are deactivated, the readout signals RA1/2 536A and RB1/2 536B are activated, and the output reset signals RSTA/B 538 are deactivated as shown. Similar to the readout operation that occurred at time T0 and at time T3, both readout signals RA1/2 536A and RB1/2 536B are activated simultaneously, such that a binned readout period occurs during which the charges that are sampled and held in both memory nodes C1A/C2A and C1B/C2B are combined or binned in-pixel at the gate terminals of the respective output source follower transistors (e.g., 430A/430B).

With the floating diffusions FDA/FDB reset by reset signals DAB 524, the sample and hold signals SA1/2 526A and SB1/2 526B are activated at time T7. At time T8, another integration period begins and the readout period ends with the modulation signals TXA/B 520 activated, the reset signals DAB 524 deactivated, the sample and hold signals SA1/2 526A and SB1/2 526B activated, the readout signals RA1/2 536A and RB1/2 536B deactivated, and the output reset signals RSTA/B 538 activated.

Figure 5B:
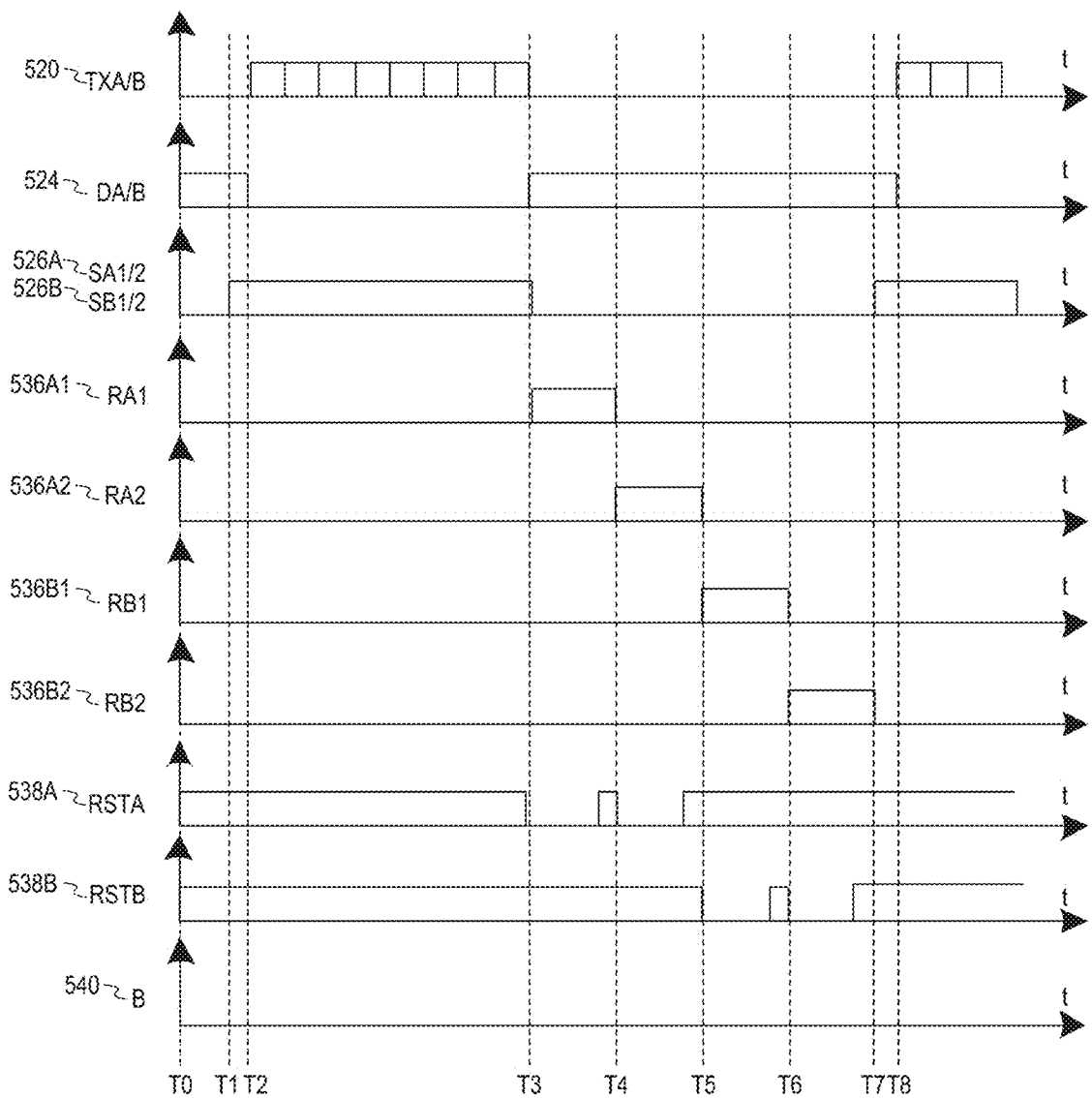

The timing diagram depicted in FIG. 5B illustrates an example of a time-of-flight sensing system that is configured for no binning and no pipelining of integration and readout operations. In the example, the binning signal B 540 is deactivated such that the binning transistors are deactivated. At time T0, the reset signals DAB 524 are activated to reset the floating diffusions FDA/FDB while the modulation signals TXA/B 520 are also deactivated. In addition, the readout signals RA1 536A1, RA2 536A2, RB1 536B1, RB2 536B2 are deactivated to deactivate the readout transistors while the output reset signals RSTA 538A and RSTB 538B are activated to reset or precharge the gate terminals of the output source follower transistors while no readout operation occurs. At this time, the sample and hold signals SA1/2 526A and SB1/2 526B are all deactivated to deactivate all of the sample and hold transistors (e.g., 426A1/426A2/426B1/426B2).

With the floating diffusions FDA/FDB reset by reset signals DAB 524, the sample and hold signals SA1/2 526A and SB1/2 526B are activated at time T1. At time T2, an integration period begins with the modulation signals TXA/B 520 activated, the reset signals DAB 524 deactivated, and the sample and hold signals SA1/2 526A and SB1/2 526B activated. During the integration period, the charges photogenerated in the photodiodes are sampled and held into the memory nodes C1A/C2A and C1B/C2B in response to the modulation signals TXA/B 520. As mentioned, no pipelined operation occurs in the example depicted in FIG. 5B, and as such, the readout signals RA1 536A1, RA2 536A2, RB1 536B1, RB2 536B2 are deactivated during the integration periods such that no readout operations occur during integration periods. In addition, the output reset signals RSTA 538A and RSTB 538B are also activated at time T2 to reset or precharge the gate terminals of the output source follower transistors while no readout operation occurs.

At time T3, the integration period ends, and thus, the modulation signals TXA/B 520 are deactivated and the reset signals DAB 524 are activated to reset the floating diffusions FDA/FDB while the modulation signals TXA/B 520 are also deactivated. At this time, a readout period begins for the charge from the photodiode (e.g., 418-1) that is sampled and held into the memory node (e.g., C1A) that is coupled to the readout transistor (e.g., 436A1) that is controlled in response to the readout signal RA1 536A1, which is turned ON at time T3. As mentioned, no binning occurs in the example depicted in FIG. 5B, and as such, the other readout transistor (e.g., 436A2) that is coupled to the same output source follower (e.g., 432A) remains turned OFF in response to readout signal RA2 536A2 in the depicted example.

Once the charge that is sampled and held in the memory node (e.g., C1A) is read out, the output reset signal RSTA 538A is pulsed as shown before time T4, and at time T4, the readout period for the charge that is sampled and held into the memory node (e.g., C1A) ends and the next readout period begins for the charge from the photodiode (e.g., 418-2) that is sampled and held into the next memory node (e.g., C2A). As such, at time T4, the readout signal RA1 536A1 is deactivated and the readout signal RA2 536A2 is activated.

Once the charge that is sampled and held in the memory node (e.g., C2A) is read out, the output reset signal RSTA 538A is turned ON as shown before time T5, and at time T5, the readout period for the charge from the photodiode (e.g., 412-2) that is sampled and held into the memory node (e.g., C2A) ends and the next readout period begins for the charge from the photodiode (e.g., 418-1) that is sampled and held into the next memory node (e.g., C1B) begins. As such, at time T5, the readout signal RA2 536A2 is deactivated, the readout signal RB1 536B1 is activated, and the output reset signal RSTB 538B is deactivated.

Once the charge that is sampled and held in the memory node (e.g., C1B) is read out, the output reset signal RSTB 538B is pulsed as shown before time T6, and at time T6, the next readout period for the charge from the photodiode (e.g., 418-1) that is sampled and held into the memory node (e.g., C1B) ends and the next readout period begins for the charge from the photodiode (e.g., 418-2) that is sampled and held into the next memory node (e.g., C2B). As such, at time T6, the readout signal RB1 536B1 is deactivated and the readout signal RB2 536B2 is activated.

Once the charge from the photodiode (e.g., 418-2) that is sampled and held in the memory node (e.g., C2B) is read out, the output reset signal RSTB 538B is turned ON as shown before time T7, and at time T7, the readout period ends as readout signal RB2 536B2 are deactivated and the sample and hold signals SA1/2 526A and SB1/2 526B are activated.

The next integration period begins at time T8 with the modulation signals TXA/B 520 activated, the reset signals DAB 524 deactivated, and the sample and hold signals SA1/2 526A and SB1/2 526B activated. During the integration period, the charges photogenerated in the photodiodes are sampled and held into the memory nodes C1A/C2A and C1B/C2B in response to the modulation signals TXA/B 520. The readout signals RA1 536A1, RA2 536A2, RB1 536B1, RB2 536B2 are deactivated during the integration period such that no readout operations occur during integration period. In addition, the output reset signals RSTA 538A and RSTB 538B also remain activated at time T8 to reset or precharge the gate terminals of the output source follower transistors while no readout operation occurs.

Figure 5C:
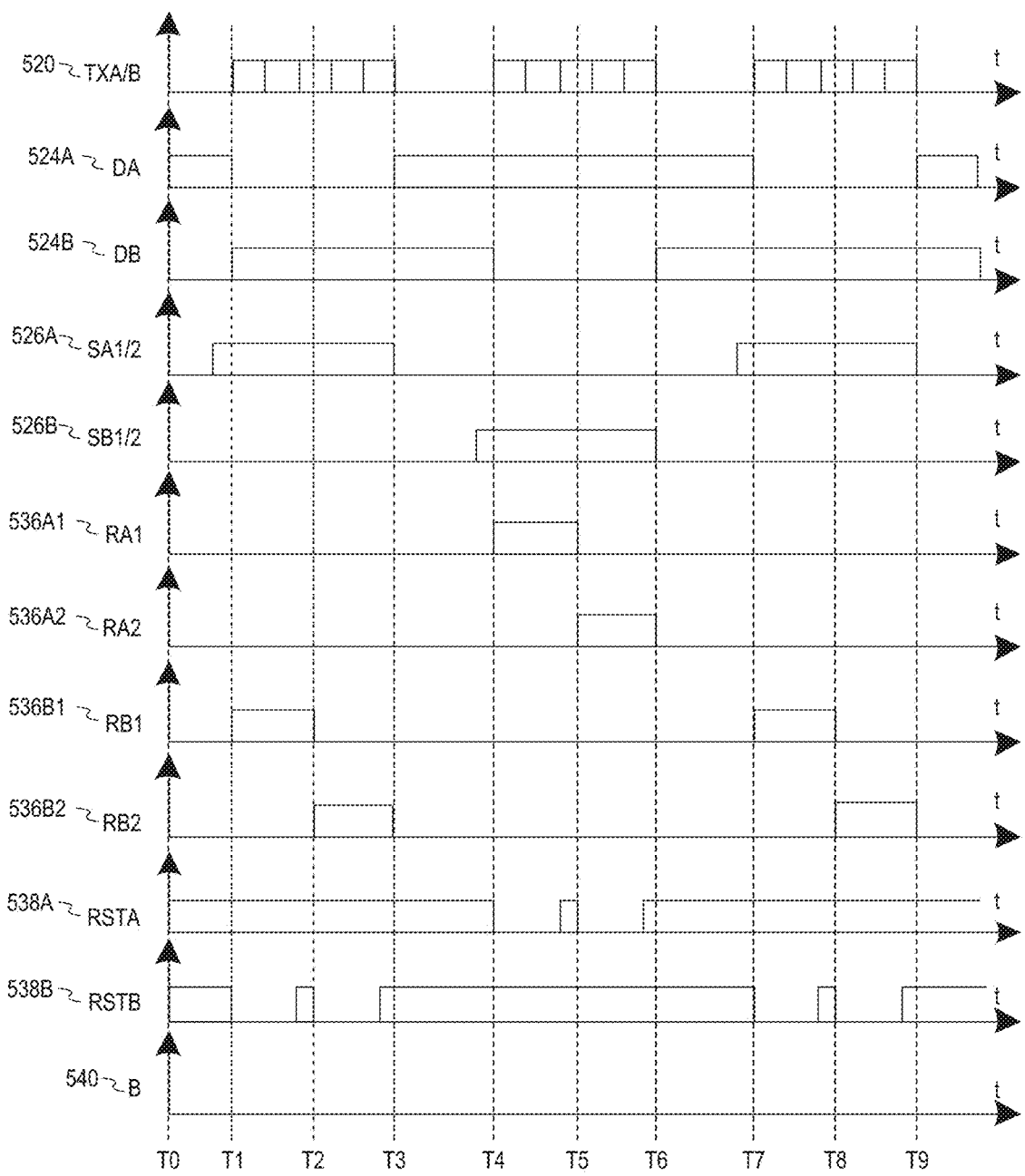

The timing diagram depicted in FIG. 5C illustrates an example of a time-of-flight sensing system that is configured for no binning, but does include pipelined operations of readout operations that can occur from one tap while integration occurs to sample and hold charge into the memory nodes that are coupled to the other tap of the pixel circuits. In the example, the binning signal B 540 is deactivated such that the binning transistors are deactivated. At time T0, the reset signal DA 524A is activated to reset the floating diffusions FDA. At this time, the output reset signals RSTA 538A and RSTB 538B are also activated to reset or precharge the gate terminals of the output source follower transistors (e.g., 430A/430B). The readout transistors are turned OFF with readout signals RA1 536A1, RA2 536A2, RB1 536B1, RB2 536B2 deactivated as shown while no readout operation occurs. At this time, the sample and hold signals SA1/2 526A and SB1/2 526B are all deactivated to deactivate all of the sample and hold transistors (e.g., 426A1/426A2/426B1/426B2).

With the floating diffusion FDA reset by reset signal DA 524A, the sample and hold signals SA1/2 526A are activated before time T1 to activate the sample and hold transistors (e.g., 426A1/426A2) that are coupled to the memory nodes C1A/C2A. At time T1, an integration period begins to sample and hold charge into the memory nodes C1A/C2A with the modulation signals TXA/B 520 activated, the reset signal DA 524A deactivated, the reset signal DB 524B activated, sample and hold signals SA1/2 526A activated, and sample and hold signals SB1/2 526B deactivated. During the integration period, the charges photogenerated in the photodiodes are sampled and held into the memory nodes C1A/C2A in response to the modulation signals TXA/B 520. As mentioned, pipelined operation with no binning occurs in the example depicted in FIG. 5C, and as such, the readout signal RB1 536B1 is activated while the readout signal RB2 536B2 is deactivated. At this time, the readout signals RA1 536A1 and RA2 536A2 are also deactivated such that only the charge from photodiode 418-1 that is sampled and held in memory node C1B is read out while the charges in memory nodes C2B, C1A, and C2A are not read out.

Once the charge from photodiode 418-1 that is sampled and held in the memory node C1B is read out, the output reset signal RSTB 538B is pulsed as shown before time T2, and at time T2, the readout period for the charge from photodiode 418-1 that is sampled and held into the memory node C1B ends and the next readout period begins for the charge from the photodiode 418-2 that is sampled and held into the next memory node C2B. As such, at time T2, the readout signal RB1 536B1 is deactivated and the readout signal RB2 536B2 is activated.

Once the charge that is sampled and held in the memory node C2B is read out, the output reset signal RSTB 538B is turned ON as shown before time T3, and at time T3, the readout period for the charge from the photodiode 418-2 that is sampled and held into the memory node C2B ends and the readout signal RB2 536B2 is deactivated. At this time, the integration period ends and the modulation signals TXA/B 520 are deactivated, the reset signal DA 524A is activated, the reset signal DB 524B remains activated, and the output reset signals RSTA 538A and RSTB 538B are activated to reset the floating diffusions FDA/FDB and reset the gate terminals of the output source follower transistors 430A/430B while the sample and hold signals SA1/2 526A and SB1/2 526B and the readout signals RA1 536A1, RA2 536A2, RB1 536B1, RB2 536B2 are all deactivated.

With the floating diffusion FDB reset by reset signal DB 524B, the sample and hold signals SB1/2 526B are activated before time T4 to activate the sample and hold transistors (e.g., 426B1/426B2) that are coupled to the memory nodes C1B/C2B. At time T4, the next integration period begins to sample and hold charge into the memory nodes C1B/C2B with the modulation signals TXA/B 520 activated, the reset signal DB 524B deactivated, the reset signal DA 524A activated, sample and hold signals SB1/2 526B activated, and sample and hold signals SA1/2 526A deactivated. During the integration period, the charges photogenerated in the photodiodes are sampled and held into the memory nodes C1B/C2B in response to the modulation signals TXA/B 520. As mentioned, pipelined operation with no binning occurs in the example depicted in FIG. 5C, and as such, the readout signal RA1 536A1 is activated while the readout signal RA2 536A2 is deactivated. At this time, the readout signals RB1 536B1 and RB2 536B2 are also deactivated such that only the charge from photodiode 418-1 that is sampled and held in memory node C1A is read out while the charges in memory nodes C2A, C1B, and C2B are not read out.

Once the charge from photodiode 418-1 that is sampled and held in the memory node C1A is read out, the output reset signal RSTA 538A is pulsed as shown before time T5, and at time T5, the readout period for the charge from photodiode 418-1 that is sampled and held into the memory node C1A ends and the next readout period begins for the charge from the photodiode 418-2 that is sampled and held into the next memory node C2A. As such, at time T5, the readout signal RA1 536A1 is deactivated and the readout signal RA2 536A2 is activated.

Once the charge that is sampled and held in the memory node C2A is read out, the output reset signal RSTA 538A is turned ON as shown before time T6, and at time T6, the readout period for the charge from the photodiode 418-2 that is sampled and held into the memory node C2A ends and the readout signal RA2 536B2 is deactivated. At this time, the integration period ends and the modulation signals TXA/B 520 are deactivated, the reset signal DA 524A remains activated, the reset signal DB 524B is activated, and the output reset signals RSTA 538A and RSTB 538B are activated to reset the floating diffusions FDA/FDB and reset the gate terminals of the output source follower transistors 430A/430B while the sample and hold signals SA1/2 526A and SB1/2 526B and the readout signals RA1 536A1, RA2 536A2, RB1 536B1, RB2 536B2 are all deactivated.

With the floating diffusion FDA reset by reset signal DA 524A, the sample and hold signals SA1/2 526A are activated before time T7 to activate the sample and hold transistors (e.g., 426A1/426A2) that are coupled to the memory nodes C1A/C2A. At time T7, the next integration period begins to sample and hold charge into the memory nodes C1A/C2A with the modulation signals TXA/B 520 activated, the reset signal DA 524A deactivated, the reset signal DB 524B activated, sample and hold signals SA1/2 526A activated, and sample and hold signals SB1/2 526B deactivated. During the integration period, the charges photogenerated in the photodiodes are sampled and held into the memory nodes C1A/C2A in response to the modulation signals TXA/B 520.

As mentioned, pipelined operation with no binning occurs in the example depicted in FIG. 5C, and as such, the readout signal RB1 536B1 is activated while the readout signal RB2 536B2 is deactivated. At this time, the readout signals RA1 536A1 and RA2 536A2 are also deactivated such that only the charge from photodiode 418-1 that is sampled and held in memory node C1B is read out while the charges in memory nodes C2B, C1A, and C2A are not read out.

Once the charge that is sampled and held in the memory node C1B is read out, the output reset signal RSTB 538B is pulsed as shown before time T8, and at time T8, the readout period for the charge from the photodiode (e.g., 412-1) that is sampled and held into the memory node C1B ends and the next readout period begins for the charge from the photodiode (e.g., 418-2) that is sampled and held into the next memory node C2B begins. As such, at time T8, the readout signal RB1 536B1 is deactivated, the readout signal RB2 536B2 is activated, and the output reset signal RSTB 538B is deactivated.

Once the charge that is sampled and held in the memory node C2B is read out, the output reset signal RSTB 538B is turned ON as shown before time T9, and at time T9, the readout period for the charge from the photodiode 418-2 that is sampled and held into the memory node C2B ends and the readout signal RB2 536B2 is deactivated. At this time, the integration period ends and the modulation signals TXA/B 520 are deactivated, the reset signal DA 524A is activated, the reset signal DB 524B remains activated, and the output reset signals RSTA 538A and RSTB 538B are activated to reset the floating diffusions FDA/FDB and reset the gate terminals of the output source follower transistors 430A/430B while the sample and hold signals SA1/2 526A and SB1/2 526B and the readout signals RA1 536A1, RA2 536A2, RB1 536B1, RB2 536B2 are all deactivated.

Figure 5D:
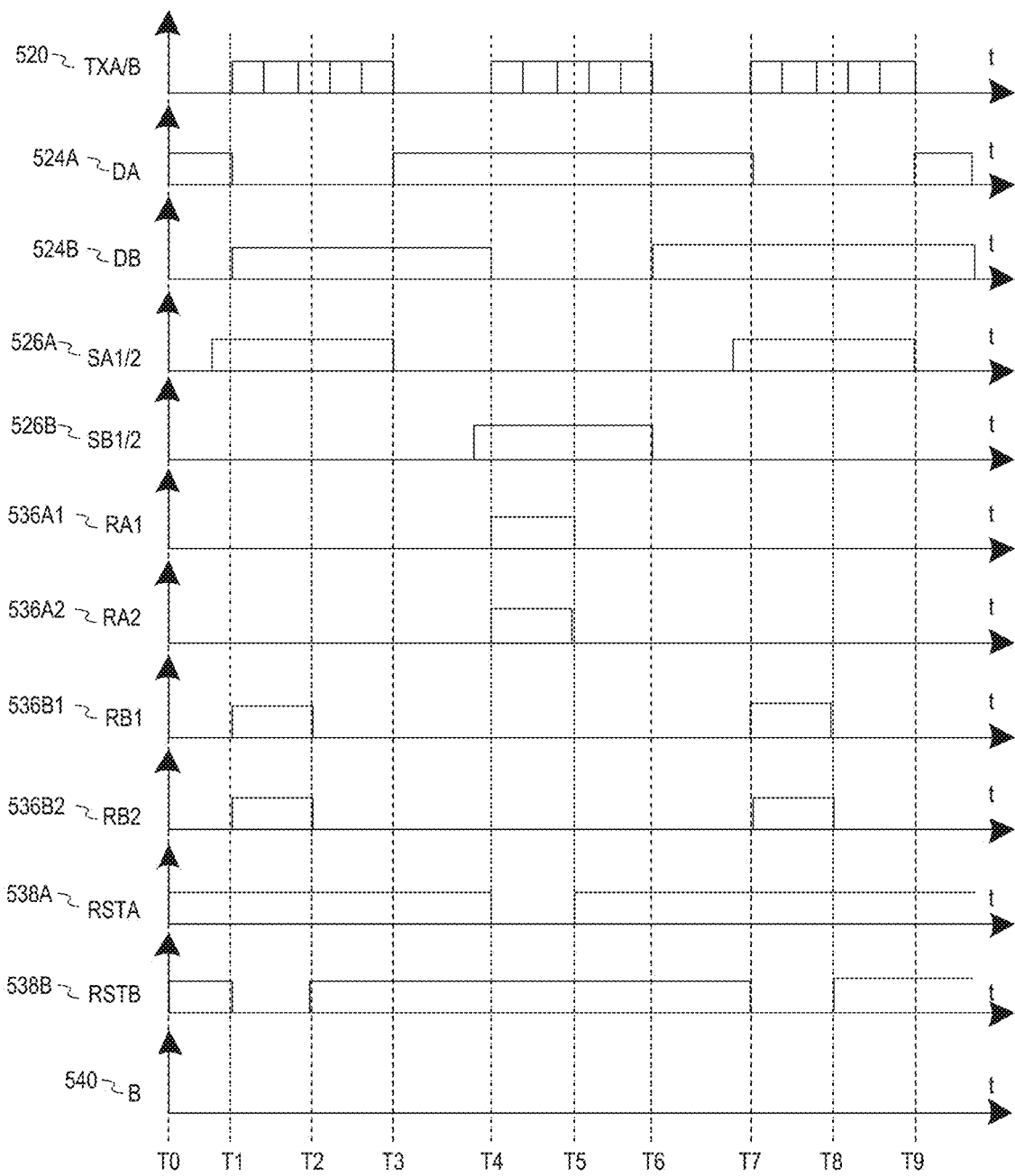

The timing diagram depicted in FIG. 5D illustrates an example of a time-of-flight sensing system that is configured for binning as well as pipelined operations of readout operations that can occur from one tap while integration occurs to sample and hold charge into the memory nodes that are coupled to the other tap of the pixel circuits. In the example, the binning signal B 540 is deactivated such that the binning transistors are deactivated. At time T0, the reset signal DA 524A is activated to reset the floating diffusions FDA. At this time, the output reset signals RSTA 538A and RSTB 538B are also activated to reset or precharge the gate terminals of the output source follower transistors (e.g., 430A/430B). The readout transistors are turned OFF with readout signals RA1 536A1, RA2 536A2, RB1 536B1, RB2 536B2 deactivated as shown while no readout operation occurs. At this time, the sample and hold signals SA1 526A1, SA2 526A2, SB1 526B1, SB2 526B2 are all deactivated to deactivate all of the sample and hold transistors (e.g., 426A1/426A2/426B1/426B2).

With the floating diffusion FDA reset by reset signal DA 524A, the sample and hold signals SA1/2 526A are activated before time T1 to activate the sample and hold transistors (e.g., 426A1/426A2) that are coupled to the memory nodes C1A/C2A. At time T1, an integration period begins to sample and hold charge into the memory nodes C1A/C2A with the modulation signals TXA/B 520 activated, the reset signal DA 524A deactivated, the reset signal DB 524B activated, sample and hold signals SA1/2 526A activated, and sample and hold signals SB1/2 526B deactivated. During the integration period, the charges photogenerated in the photodiodes are sampled and held into the memory nodes C1A/C2A in response to the modulation signals TXA/B 520. As mentioned, pipelined operation with binning occurs in the example depicted in FIG. 5D, and as such, both readout signal RB1 536B1 and readout signal RB2 536B2 are activated simultaneously at time T1 as shown. At this time, the output reset signal RSTB 538B as well as both the readout signals RA1 536A1 and RA2 536A2 are all deactivated. As such, the charges from both photodiodes 418-1/418-2 that are sampled and held in the memory nodes C1B/C2B are combined or binned at the gate terminal of the output source follower transistor 430B to provide in-pixel binning of the charges from photodiodes 418-1/418-2 at the output coupled to the output source follower transistor 430B while integration occurs at memory nodes C1A/C2A.

At time T2, the readout of the charges that are sampled and held in memory nodes C1B/C2B ends as the readout signal RB1 536B1 and readout signal RB2 536B2 are deactivated and the output reset signal RSTB 538B is reactivated.

At time T3, the integration period ends as the modulation signals TXA/B 520 and sample and hold signals SA1/2 526A are deactivated, and the reset signal DA 524A is reactivated.

With the floating diffusion FDB reset by reset signal DB 524B, the sample and hold signals SB1/2 526B are activated before time T4 to activate the sample and hold transistors (e.g., 426B1/426B2) that are coupled to the memory nodes C1B/C2B. At time T4, the next integration period begins to sample and hold charge into the memory nodes C1B/C2B with the modulation signals TXA/B 520 activated, the reset signal DA 524A activated, the reset signal DB 524B deactivated, sample and hold signals SA1/2 526A deactivated, and sample and hold signals SB1/2 526B activated. During the integration period, the charges photogenerated in the photodiodes are sampled and held into the memory nodes C1B/C2B in response to the modulation signals TXA/B 520. As mentioned, pipelined operation with binning occurs in the example depicted in FIG. 5D, and as such, both readout signal RA1 536A1 and readout signal RA2 536A2 are activated simultaneously at time T4 as shown. At this time, the output reset signal RSTA 538A as well as both the readout signals RB1 536B1 and RB2 536B2 are all deactivated. As such, the charges from both photodiodes 418-1/418-2 that are sampled and held in the memory nodes C1A/C2A are combined or binned at the gate terminal of the output source follower transistor 430A to provide in-pixel binning of the charges from photodiodes 418-1/418-2 at the output coupled to the output source follower transistor 430A while integration occurs at memory nodes C1B/C2B.

At time T5, the readout of the charges that are sampled and held in memory nodes C1A/C2A ends as the readout signal RA1 536A1 and readout signal RA2 536A2 are deactivated and the output reset signal RSTA 538A is reactivated.

At time T6, the integration period ends as the modulation signals TXA/B 520 and sample and hold signals SB1/2 526B are deactivated, and the reset signal DB 524B is reactivated.

With the floating diffusion FDA reset by reset signal DA 524A, the sample and hold signals SA1/2 526A are activated before time T7 to activate the sample and hold transistors (e.g., 426A1/426A2) that are coupled to the memory nodes C1A/C2A. At time T7, the next integration period begins to sample and hold charge into the memory nodes C1A/C2A with the modulation signals TXA/B 520 activated, the reset signal DA 524A deactivated, the reset signal DB 524B activated, sample and hold signals SA1/2 526A activated, and sample and hold signals SB1/2 526B deactivated. During the integration period, the charges photogenerated in the photodiodes are sampled and held into the memory nodes C1A/C2A in response to the modulation signals TXA/B 520. As mentioned, pipelined operation with binning occurs in the example depicted in FIG. 5D, and as such, both readout signal RB1 536B1 and readout signal RB2 536B2 are activated simultaneously at time T7 as shown. At this time, the output reset signal RSTB 538B as well as both the readout signals RA1 536A1 and RA2 536A2 are all deactivated. As such, the charges from both photodiodes 418-1/418-2 that are sampled and held in the memory nodes C1B/C2B are combined or binned at the gate terminal of the output source follower transistor 430B to provide in-pixel binning of the charges from photodiodes 418-1/418-2 at the output coupled to the output source follower transistor 430B while integration occurs at memory nodes C1A/C2A.

At time T8, the readout of the charges that are sampled and held in memory nodes C1B/C2B ends as the readout signal RB1 536B1 and readout signal RB2 536B2 are deactivated and the output reset signal RSTB 538B is reactivated.

At time T9, the integration period ends as the modulation signals TXA/B 520 and sample and hold signals SA1/2 526A are deactivated, and the reset signal DA 524A is reactivated.

Figure 5E:
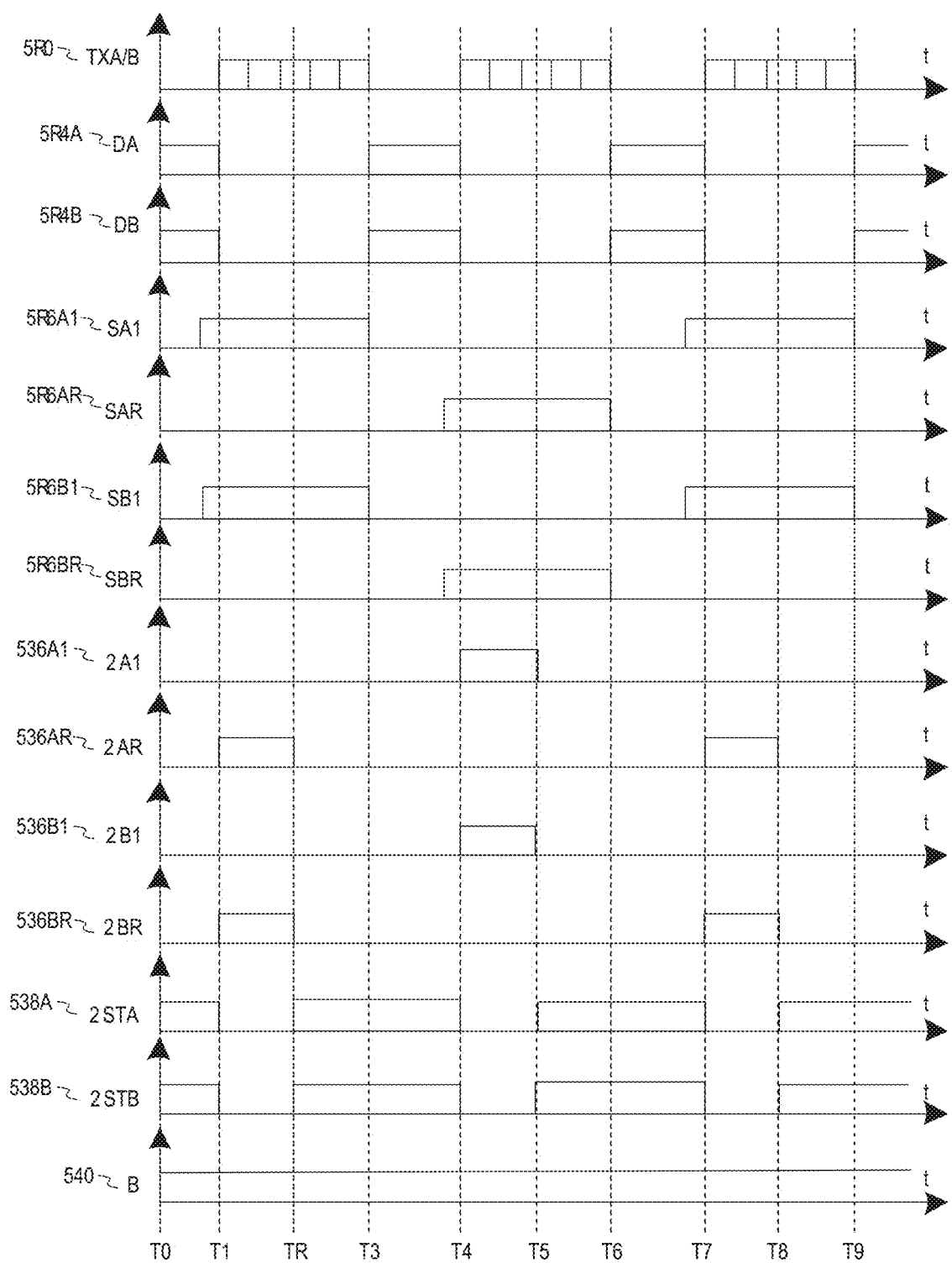

The timing diagram depicted in FIG. 5E illustrates another example of a time-of-flight sensing system that is configured for binning as well as pipelined operations of readout operations that can occur from one tap while integration occurs to sample and hold charge into the memory nodes that are coupled to the other tap of the pixel circuits. In the example, the binning signal B 540 is activated such that the binning transistors are deactivated. As such, the floating diffusions FDA 422A1 and FDA 422A2 are coupled together through binning transistor 440A. Similarly, the floating diffusions FDB 422B1 and FDB 422B2 are coupled together through binning transistor 440B.

At time T0, the reset signals DA 524A and DB 524B are activated to reset the all of floating diffusions FDA and FDB and the output reset signals RSTA 538A and RSTB 538B are also activated to reset or precharge the gate terminals of the output source follower transistors (e.g., 430A/430B). The readout transistors are turned OFF with readout signals RA1 536A1, RA2 536A2, RB1 536B1, RB2 536B2 deactivated as shown while no readout operation occurs. At this time, the sample and hold signals SA1 526A1, SA2 526A2, SB1 526B1, SB2 526B2 are all deactivated to deactivate all of the sample and hold transistors (e.g., 426A1/426A2/426B1/426B2).

With the floating diffusions FDA and FDB reset by reset signal DA 524A and reset signal DB 524B, the sample and hold signals SA1 526A1 and SB1 526B1 are activated before time T1 to activate the sample and hold transistors (e.g., 426A1/426B1) that are coupled to the memory nodes C1A/C1B. At time T1, an integration period begins to sample and hold charge into the memory nodes C1A/C1B with the modulation signals TXA/B 520 activated, the reset signal DA 524A deactivated, the reset signal DB 524B deactivated, sample and hold signal SA1 526A1 activated, sample and hold signal SA2 526A2 deactivated, sample and hold signal SB1 526B1 activated, and sample and hold signal SB2 526B2 deactivated. During the integration period, the charges photogenerated in both photodiodes 418-1/418-2 are sampled and held into the memory nodes C1A/C1B in response to the modulation signals TXA/B 520. As such, the charges from both photodiodes 418-1/418-2 are combined or binned with the binning transistors 440A/440B turned ON. The binned charges are sampled and held into the memory nodes C1A/C1B. As mentioned, pipelined operation with binning occurs in the example depicted in FIG. 5E, and as such, both readout signal RA2 536A2 and readout signal RB2 536B2 are activated simultaneously at time T1 as shown. At this time, the output reset signal RSTA 538A as well as output reset signal RSTB 538B are deactivated. The binned charge that was previously sampled and held in memory node C2A from photodiodes 418-1/418-2 is read out through output source follower transistor 430A and the binned charge that was previously sampled and held in memory node C2B from photodiodes 418-1/418-2 is read out through output source follower transistor 430B at this time.

At time T2, the readout of the binned charges that are sampled and held in memory nodes C2A/C2B ends as the readout signal RA2 536A2 and readout signal RB2 536B2 are deactivated and the output reset signals RSTA 538A and RSTB 538B are reactivated.

At time T3, the integration period ends as the modulation signals TXA/B 520 and sample and hold signals SA1 526A1 and SB1 526B1 are deactivated, and the reset signals DA 524A and DB 524B are reactivated.

With the floating diffusions FDA and FDB reset by reset signal DA 524A and reset signal DB 524B, the sample and hold signals SA2 526A2 and SB2 526B2 are activated before time T4 to activate the sample and hold transistors (e.g., 426A2/426B2) that are coupled to the memory nodes C2A/C2B. At time T4, the next integration period begins to sample and hold charge into the memory nodes C2A/C2B with the modulation signals TXA/B 520 activated, the reset signal DA 524A deactivated, the reset signal DB 524B deactivated, sample and hold signal SA1 526A1 deactivated, sample and hold signal SA2 526A2 activated, sample and hold signal SB1 526B1 deactivated, and sample and hold signals SB2 526B2 activated. During the integration period, the charges photogenerated in both photodiodes 418-1/418-2 are sampled and held into the memory nodes C2A/C2B in response to the modulation signals TXA/B 520. As such, the charges from both photodiodes 418-1/418-2 are combined or binned with the binning transistors 440A/440B turned ON. The binned charges are sampled and held into the memory nodes C2A/C2B. As mentioned, pipelined operation with binning occurs in the example depicted in FIG. 5E, and as such, both readout signal RA1 536A1 and readout signal RB1 536B1 are activated simultaneously at time T4 as shown. At this time, the output reset signal RSTA 538A as well as output reset signal RSTB 538B are deactivated. The binned charge that was previously sampled and held in memory node C1A from photodiodes 418-1/418-2 is read out through output source follower transistor 430A and the binned charge that was previously sampled and held in memory node C1B from photodiodes 418-1/418-2 is read out through output source follower transistor 430B at this time.

At time T5, the readout of the binned charges that are sampled and held in memory nodes C1A/12B ends as the readout signal RA1 536A1 and readout signal RB1 536B1 are deactivated and the output reset signals RSTA 538A and RSTB 538B are reactivated.

At time T6, the integration period ends as the modulation signals TXA/B 520 and sample and hold signals SA2 526A2 and SB2 526B2 are deactivated, and the reset signals DA 524A and DB 524B are reactivated.

With the floating diffusions FDA and FDB reset by reset signal DA 524A and reset signal DB 524B, the sample and hold signals SA1 526A1 and SB1 526B1 are activated before time T7 to activate the sample and hold transistors (e.g., 426A1/426B1) that are coupled to the memory nodes C1A/C1B. At time T7, the next integration period begins to sample and hold charge into the memory nodes C1A/C1B with the modulation signals TXA/B 520 activated, the reset signal DA 524A deactivated, the reset signal DB 524B deactivated, sample and hold signal SA1 526A1 activated, sample and hold signal SA2 526A2 deactivated, sample and hold signal SB1 526B1 activated, and sample and hold signal SB2 526B2 deactivated. During the integration period, the charges photogenerated in both photodiodes 418-1/418-2 are sampled and held into the memory nodes C1A/C1B in response to the modulation signals TXA/B 520. As such, the charges from both photodiodes 418-1/418-2 are combined or binned with the binning transistors 440A/440B turned ON. The binned charges are sampled and held into the memory nodes C1A/C1B. As mentioned, pipelined operation with binning occurs in the example depicted in FIG. 5E, and as such, both readout signal RA2 536A2 and readout signal RB2 536B2 are activated simultaneously at time T7 as shown. At this time, the output reset signal RSTA 538A as well as output reset signal RSTB 538B are deactivated. The binned charge that was previously sampled and held in memory node C2A from photodiodes 418-1/418-2 is read out through output source follower transistor 430A and the binned charge that was previously sampled and held in memory node C2B from photodiodes 418-1/418-2 is read out through output source follower transistor 430B at this time.

At time T8, the readout of the binned charges that are sampled and held in memory nodes C2A/C2B ends as the readout signal RA2 536A2 and readout signal RB2 536B2 are deactivated and the output reset signals RSTA 538A and RSTB 538B are reactivated.

At time T9, the integration period ends as the modulation signals TXA/B 520 and sample and hold signals SA1 526A1 and SB1 526B1 are deactivated, and the reset signals DA 524A and DB 524B are reactivated.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:
1. A time-of-flight pixel array, comprising:
  a plurality of photodiodes configured to generate charge in response to reflected modulated light incident upon the plurality of photodiodes;
  a plurality of transfer transistors coupled to the plurality of photodiodes, wherein the plurality of transfer transistors includes a plurality of first transfer transistors and a plurality of second transfer transistors, wherein the plurality of first transfer transistors is configured to transfer a first portion of the charge from the plurality of photodiodes in response to a first modulation signal, wherein the plurality of second transfer transistors is configured to transfer a second portion of the charge from the plurality of photodiodes in response to a second modulation signal, wherein the second modulation signal is an inverted first modulation signal;

a plurality of floating diffusions, wherein the plurality of floating diffusions includes a plurality of first floating diffusions coupled to the plurality of first transfer transistors;

a plurality of binning transistors, wherein the plurality of binning transistors includes a plurality of first binning transistors, wherein a first one of the plurality of first binning transistors is coupled between a first one of the plurality of first floating diffusions and a second one of the plurality of first floating diffusions;

a plurality of sample and hold transistors, wherein the plurality of sample and hold transistors includes a plurality of first sample and hold transistors coupled to the plurality of first floating diffusions; and a plurality of memory nodes, wherein the plurality of memory nodes includes a plurality of first memory nodes, wherein a first one of the plurality of first memory nodes is coupled to the first one of the plurality of first floating diffusions through a first one of the plurality of first sample and hold transistors, wherein a second one of the plurality of first memory nodes is coupled to the second one of the plurality of first floating diffusions through a second one of the plurality of first sample and hold transistors.

2. The time-of-flight pixel array of claim 1, further comprising:

a plurality of readout transistors, wherein the plurality of readout transistors includes a plurality of first readout transistors coupled to the plurality of first memory nodes;

a plurality of source follower transistors, wherein the plurality of source follower transistors includes a plurality of first source follower transistors, wherein a gate of a first one of the plurality of first source follower transistors is coupled to the first one of the plurality of first memory nodes through a first one of the plurality of first readout transistors, wherein the gate of the first one of the plurality of first source follower transistors is coupled to the second one of the plurality of first memory nodes through a second one of the plurality of first readout transistors; and a plurality of row select transistors, wherein the plurality of row select transistors includes a plurality of first row select transistors, wherein a first one of the plurality of first row select transistors is coupled between the first one of the plurality of first source follower transistors and a first bitline.

3. The time-of-flight pixel array of claim 2, further comprising:

a plurality of diffusion reset transistors, wherein the plurality of diffusion reset transistors includes a plurality of first diffusion reset transistors coupled between a supply rail and the plurality of first floating diffusions; and a plurality of output reset transistors, wherein the plurality of output reset transistors includes a plurality of first output reset transistors coupled between the supply rail and the plurality of first source follower transistors.

4. The time-of-flight pixel array of claim 3, wherein the plurality of floating diffusions further includes a plurality of second floating diffusions coupled to the plurality of second transfer transistors, wherein the plurality of binning transistors further includes a plurality of second binning transistors, wherein a first one of the plurality of second binning transistors is coupled between a first one of the plurality of second floating diffusions and a second one of the plurality of second floating diffusions, wherein the plurality of sample and hold transistors further includes a plurality of second sample and hold transistors coupled to the plurality of second floating diffusions, wherein the plurality of memory nodes further includes a plurality of second memory nodes, wherein a first one of the plurality of second memory nodes is coupled to the first one of the plurality of second floating diffusions through a first one of the plurality of second sample and hold transistors, wherein a second one of the plurality of second memory nodes is coupled to the second one of the plurality of second floating diffusions through a second one of the plurality of second sample and hold transistors.

5. The time-of-flight pixel array of claim 4, wherein the plurality of readout transistors further includes a plurality of second readout transistors coupled to the plurality of second memory nodes, wherein the plurality of source follower transistors further includes a plurality of second source follower transistors, wherein a gate of a first one of the plurality of second source follower transistors is coupled to the first one of the plurality of second memory nodes through a first one of the plurality of second readout transistors, wherein the gate of the first one of the plurality of second source follower transistors is coupled to the second one of the plurality of second memory nodes through a second one of the plurality of second readout transistors, wherein the plurality of row select transistors further includes a plurality of second row select transistors, wherein a first one of the plurality of second row select transistors is coupled between the first one of the plurality of second source follower transistors and a second bitline.

6. The time-of-flight pixel array of claim 5, wherein the plurality of diffusion reset transistors further includes a plurality of second diffusion reset transistors coupled between the supply rail and the plurality of second floating diffusions, wherein the plurality of output reset transistors further includes a plurality of second output reset transistors coupled between the supply rail and the plurality of second source follower transistors.

7. The time-of-flight pixel array of claim 6, wherein a first one of the plurality of photodiodes is coupled to the first one of the plurality of first floating diffusions through a first one of the plurality of first transfer transistors and to the first one of the plurality of second floating diffusions through a first one of the plurality of second transfer transistors, wherein a second one of the plurality of photodiodes is coupled to the second one of the plurality of first floating diffusions through a second one of the plurality of first transfer transistors and to the second one of the plurality of second floating diffusions through a second one of the plurality of second transfer transistors.

8. The time-of-flight pixel array of claim 7, wherein the first one of the plurality of first sample and hold transistors and the second one of the plurality of first sample and hold transistors are configured to be turned ON simultaneously to sample and hold the first portion of the charge from the first one of the plurality of photodiodes in the first one of the plurality of first memory nodes and to sample and hold the first portion of the charge from the second one of the plurality of photodiodes in the second one of the plurality of first memory nodes, wherein the first one of the plurality of second sample and hold transistors and the second one of the plurality of second sample and hold transistors are configured to be turned ON simultaneously to sample and hold the second portion of the charge from the first one of the plurality of photodiodes in the first one of the plurality of second memory nodes and to sample and hold the second portion of the charge from the second one of the plurality of photodiodes in the second one of the plurality of second memory nodes.

9. The time-of-flight pixel array of claim 8, wherein the first one of the plurality of first readout transistors and the second one of the plurality of first readout transistors are configured to be turned ON simultaneously to perform a first binned readout of the first portion of the charge from the first one of the plurality of photodiodes and the second one of the plurality of photodiodes through the first bitline, wherein the first one of the plurality of second readout transistors and the second one of the plurality of second readout transistors are configured to be turned ON simultaneously to perform a second binned readout of the first portion of the charge from the first one of the plurality of photodiodes and the second one of the plurality of photodiodes through the second bitline, wherein the first one of the plurality of first sample and hold transistors, the second one of the plurality of first sample and hold transistors, the first one of the plurality of second sample and hold transistors, and the second one of the plurality of second sample and hold transistors are configured to be turned ON simultaneously prior to the first one of the plurality of first readout transistors and the second one of the plurality of first readout transistors being turned ON simultaneously, and prior to the first one of the plurality of second readout transistors and the second one of the plurality of second readout transistors being turned ON simultaneously.

10. The time-of-flight pixel array of claim 8, wherein the first one of the plurality of first readout transistors is configured to be turned ON and OFF to perform a first non-binned readout of the first portion of the charge from the first one of the plurality of photodiodes through the first bitline, wherein the second one of the plurality of first readout transistors is configured to be turned ON and OFF to perform a second non-binned readout of the first portion of the charge from the second one of the plurality of photodiodes through the first bitline, wherein the first one of the plurality of second readout transistors is configured to be turned ON and OFF to perform a first non-binned readout of the second portion of the charge from the first one of the plurality of photodiodes through the second bitline, wherein the second one of the plurality of second readout transistors is configured to be turned ON and OFF to perform a second non-binned readout of the second portion of the charge from the second one of the plurality of photodiodes through the second bitline, wherein the first one of the plurality of first readout transistors, the second one of the plurality of first readout transistors, the first one of the plurality of second readout transistors, and the second one of the plurality of second readout transistors are configured to be turned ON and OFF sequentially after the first one of the plurality of first sample and hold transistors, the second one of the plurality of first sample and hold transistors, the first one of the plurality of second sample and hold transistors, and the second one of the plurality of second sample and hold transistors are configured to be turned ON simultaneously.

11. The time-of-flight pixel array of claim 8, wherein the first one of the plurality of first sample and hold transistors and the second one of the plurality of first sample and hold transistors are configured to be turned ON simultaneously while the first one of the plurality of second sample and hold transistors and the second one of the plurality of second sample and hold transistors are configured to be turned OFF simultaneously, wherein the first one of the plurality of second sample and hold transistors and the second one of the plurality of second sample and hold transistors are configured to be turned ON simultaneously while the first one of the plurality of first sample and hold transistors and the second one of the plurality of first sample and hold transistors are configured to be turned OFF simultaneously.

12. The time-of-flight pixel array of claim 11, wherein the first one of the plurality of first readout transistors is configured to be turned ON and OFF to perform a first non-binned readout of the first portion of the charge from the first one of the plurality of photodiodes through the first bitline, wherein the second one of the plurality of first readout transistors is configured to be turned ON and OFF to perform a second non-binned readout of the first portion of the charge from the second one of the plurality of photodiodes through the first bitline, wherein the first one of the plurality of first readout transistors and the second one of the plurality of first readout transistors are configured to be turned ON and OFF sequentially while the first one of the plurality of second sample and hold transistors and the second one of the plurality of second sample and hold transistors are configured to be turned ON simultaneously, wherein the first one of the plurality of second readout transistors is configured to be turned ON and OFF to perform a first non-binned readout of the second portion of the charge from the first one of the plurality of photodiodes through the second bitline, wherein the second one of the plurality of second readout transistors is configured to be turned ON and OFF to perform a second non-binned readout of the second portion of the charge from the second one of the plurality of photodiodes through the second bitline, wherein the first one of the plurality of second readout transistors and the second one of the plurality of second readout transistors are configured to be turned ON and OFF sequentially while the first one of the plurality of first sample and hold transistors and the second one of the plurality of first sample and hold transistors are configured to be turned ON simultaneously.

13. The time-of-flight pixel array of claim 11, wherein the first one of the plurality of first readout transistors and the second one of the plurality of first readout transistors are configured to be turned ON simultaneously to perform a first binned readout of the first portion of the charge from the first one of the plurality of photodiodes and the second one of the plurality of photodiodes through the first bitline, wherein the first one of the plurality of first readout transistors and the second one of the plurality of first readout transistors are configured to be turned ON simultaneously while the first one of the plurality of second sample and hold transistors and the second one of the plurality of second sample and hold transistors are configured to be turned ON simultaneously, wherein the first one of the plurality of second readout transistors and the second one of the plurality of second readout transistors are configured to be turned ON simultaneously to perform a second binned readout of the first portion of the charge from the first one of the plurality of photodiodes and the second one of the plurality of photodiodes through the second bitline, wherein the first one of the plurality of second readout transistors and the second one of the plurality of second readout transistors are configured to be turned ON simultaneously while the first one of the plurality of first sample and hold transistors and the second one of the plurality of first sample and hold transistors are configured to be turned ON simultaneously.

14. The time-of-flight pixel array of claim 7, wherein the first one of the plurality of first binning transistors and the first one of the plurality of second binning transistors are configured to be turned ON simultaneously to couple the first one of the plurality of first floating diffusions to the second one of the plurality of first floating diffusions and to coupled the first one of the plurality of second floating diffusions to the second one of the plurality of second floating diffusions.

15. The time-of-flight pixel array of claim 14,
wherein the first one of the plurality of first sample and hold transistors and the first one of the plurality of second sample and hold transistors are configured to be turned ON simultaneously to sample and hold the first portion of the charge from the first one of the plurality of photodiodes in the first one of the plurality of first memory nodes and to sample and hold the second portion of the charge from the first one of the plurality of photodiodes in the first one of the plurality of second memory nodes, wherein the second one of the plurality of first sample and hold transistors and the second one of the plurality of second sample and hold transistors are configured to be turned ON simultaneously to sample and hold the first portion of the charge from the first one of the plurality of photodiodes in the second one of the plurality of first memory nodes and to sample and hold the second portion of the charge from the second one of the plurality of photodiodes in the second one of the plurality of second memory nodes, wherein the first one of the plurality of first sample and hold transistors and the first one of the plurality of second sample and hold transistors are configured to be turned ON simultaneously while the second one of the plurality of first sample and hold transistors and the second one of the plurality of second sample and hold transistors are configured to be turned OFF simultaneously, wherein the second one of the plurality of first sample and hold transistors and the second one of the plurality of second sample and hold transistors are configured to be turned ON simultaneously while the first one of the plurality of first sample and hold transistors and the first one of the plurality of second sample and hold transistors are configured to be turned OFF simultaneously.

16. The time-of-flight pixel array of claim 15,
wherein the first one of the plurality of first readout transistors and the first one of the plurality of second readout transistors are configured to be turned ON simultaneously to perform a first binned readout of the first portion of the charge from the first one of the plurality of photodiodes and the second one of the plurality of photodiodes through the first bitline and a first binned readout of the second portion of the charge from the first one of the plurality of photodiodes and the second one of the plurality of photodiodes through the second bitline while the second one of the plurality of first sample and hold transistors and the second one of the plurality of second sample and hold transistors are configured to be turned ON simultaneously, wherein the second one of the plurality of first readout transistors and the second one of the plurality of second readout transistors are configured to be turned ON simultaneously to perform a second binned readout of the first portion of the charge from the first one of the plurality of photodiodes and the second one of the plurality of photodiodes through the first bitline and a second binned readout of the second portion of the charge from the first one of the plurality of photodiodes and the second one of the plurality of photodiodes through the second bitline while the first one of the plurality of first sample and hold transistors and the first one of the plurality of second sample and hold transistors are configured to be turned ON simultaneously.

17. The time-of-flight pixel array of claim 7,
wherein a third one of the plurality of photodiodes is coupled to a third one of the plurality of first floating diffusions through a third one of the plurality of first transfer transistors and to a third one of the plurality of second floating diffusions through a third one of the plurality of second transfer transistors, wherein a fourth one of the plurality of photodiodes is coupled to a fourth one of the plurality of first floating diffusions through a fourth one of the plurality of first transfer transistors and to a fourth one of the plurality of second floating diffusions through a fourth one of the plurality of second transfer transistors, wherein a second one of the plurality of first binning transistors is coupled between the third one of the plurality of first floating diffusions and the fourth one of the plurality of first floating diffusions, wherein a second one of the plurality of second binning transistors is coupled between the third one of the plurality of second floating diffusions and the fourth one of the plurality of second floating diffusions.

18. The time-of-flight pixel array of claim 17,
wherein a third one of the plurality of first memory nodes is coupled to the third one of the plurality of first floating diffusions through a third one of the plurality of first sample and hold transistors, wherein a fourth one of the plurality of first memory nodes is coupled to the fourth one of the plurality of first floating diffusions through a fourth one of the plurality of first sample and hold transistors, wherein a third one of the plurality of second memory nodes is coupled to the third one of the plurality of second floating diffusions through a third one of the plurality of second sample and hold transistors, wherein a fourth one of the plurality of second memory nodes is coupled to the fourth one of the plurality of second floating diffusions through a fourth one of the plurality of second sample and hold transistors.

19. The time-of-flight pixel array of claim 18, wherein a gate of a second one of the plurality of first source follower transistors is coupled to the third one of the plurality of first memory nodes through a third one of the plurality of first readout transistors, wherein the gate of the second one of the plurality of first source follower transistors is coupled to the fourth one of the plurality of first memory nodes through a fourth one of the plurality of first readout transistors,
wherein a gate of a second one of the plurality of second source follower transistors is coupled to the third one of the plurality of second memory nodes through a third one of the plurality of second readout transistors, wherein the gate of the second one of the plurality of second source follower transistors is coupled to the fourth one of the plurality of second memory nodes through a fourth one of the plurality of second readout transistors,
wherein a second one of the plurality of first row select transistors is coupled between the second one of the plurality of first source follower transistors and a third bitline,
wherein a second one of the plurality of second row select transistors is coupled between the second one of the plurality of second source follower transistors and a fourth bitline.

20. The time-of-flight pixel array of claim 19, wherein the first one of the plurality of photodiodes and the third one of the plurality of photodiodes are capable of being configured to be binned in response to coupling the first bitline to the third bitline and coupling the second bitline to the fourth bitline.

21. The time-of-flight pixel array of claim 20, wherein the first and second ones of the plurality of photodiodes and the third and fourth ones of the plurality of photodiodes are capable of being configured to be binned in response to coupling the first bitline to the third bitline and coupling the second bitline to the fourth bitline.

22. A time-of-flight sensing system, comprising:
a light source configured to emit modulated light to an object; and
a time-of-flight pixel array configured to be illuminated with the modulated light reflected from the object, wherein the time-of-flight pixel array comprises a plurality of time-of-flight pixel circuits, wherein each one of the plurality of time-of-flight pixel circuits comprises:
a plurality of photodiodes configured to generate charge in response to reflected modulated light incident upon the plurality of photodiodes;
a plurality of transfer transistors coupled to the plurality of photodiodes, wherein the plurality of transfer transistors includes a plurality of first transfer transistors and a plurality of second transfer transistors, wherein the plurality of first transfer transistors is configured to transfer a first portion of the charge from the plurality of photodiodes in response to a first modulation signal, wherein the plurality of second transfer transistors is configured to transfer a second portion of the charge from the plurality of photodiodes in response to a second modulation signal, wherein the second modulation signal is an inverted first modulation signal;
a plurality of floating diffusions, wherein the plurality of floating diffusions includes a plurality of first floating diffusions coupled to the plurality of first transfer transistors;
a plurality of binning transistors, wherein the plurality of binning transistors includes a plurality of first binning transistors, wherein a first one of the plurality of first binning transistors is coupled between a first one of the plurality of first floating diffusions and a second one of the plurality of first floating diffusions;
a plurality of sample and hold transistors, wherein the plurality of sample and hold transistors includes a plurality of first sample and hold transistors coupled the plurality of first floating diffusions; and
a plurality of memory nodes, wherein the plurality of memory nodes includes a plurality of first memory nodes, wherein a first one of the plurality of first memory nodes is coupled to the first one of the plurality of first floating diffusions through a first one of the plurality of first sample and hold transistors, wherein a second one of the plurality of first memory nodes is coupled to the second one of the plurality of first floating diffusions through a second one of the plurality of first sample and hold transistors.

23. The time-of-flight sensing system of claim 22, wherein each one of the plurality of time-of-flight pixel circuits further comprises:
a plurality of readout transistors, wherein the plurality of readout transistors includes a plurality of first readout transistors coupled to the plurality of first memory nodes;
a plurality of source follower transistors, wherein the plurality of source follower transistors includes a plurality of first source follower transistors, wherein a gate of a first one of the plurality of first source follower transistors is coupled to the first one of the plurality of first memory nodes through a first one of the plurality of first readout transistors, wherein the gate of the first one of the plurality of first source follower transistors is coupled to the second one of the plurality of first memory nodes through a second one of the plurality of first readout transistors; and
a plurality of row select transistors, wherein the plurality of row select transistors includes a plurality of first row select transistors, wherein a first one of the plurality of first row select transistors is coupled between the first one of the plurality of first source follower transistors and a first bitline.

24. The time-of-flight sensing system of claim 23, further comprising:
a plurality of diffusion reset transistors, wherein the plurality of diffusion reset transistors includes a plurality of first diffusion reset transistors coupled between a supply rail and the plurality of first floating diffusions; and
a plurality of output reset transistors, wherein the plurality of output reset transistors includes a plurality of first output reset transistors coupled between the supply rail and the plurality of first source follower transistors.

25. The time-of-flight sensing system of claim 24, wherein the plurality of floating diffusions further includes a plurality of second floating diffusions coupled to the plurality of second transfer transistors,
wherein the plurality of binning transistors further includes a plurality of second binning transistors, wherein a first one of the plurality of second binning transistors is coupled between a first one of the plurality of second floating diffusions and a second one of the plurality of second floating diffusions, wherein the plurality of sample and hold transistors further includes a plurality of second sample and hold transistors coupled to the plurality of second floating diffusions, wherein the plurality of memory nodes further includes a plurality of second memory nodes, wherein a first one of the plurality of second memory nodes is coupled to the first one of the plurality of second floating diffusions through a first one of the plurality of second sample and hold transistors, wherein a second one of the plurality of second memory nodes is coupled to the second one of the plurality of second floating diffusions through a second one of the plurality of second sample and hold transistors.

26. The time-of-flight sensing system of claim 25, wherein the plurality of readout transistors further includes a plurality of second readout transistors coupled to the plurality of second memory nodes, wherein the plurality of source follower transistors further includes a plurality of second source follower transistors, wherein a gate of a first one of the plurality of second source follower transistors is coupled to the first one of the plurality of second memory nodes through a first one of the plurality of second readout transistors, wherein the gate of the first one of the plurality of second source follower transistors is coupled to the second one of the plurality of second memory nodes through a second one of the plurality of second readout transistors, wherein the plurality of row select transistors further includes a plurality of second row select transistors, wherein a first one of the plurality of second row select transistors is coupled between the first one of the plurality of second source follower transistors and a second bitline.

27. The time-of-flight sensing system of claim 26, wherein the plurality of diffusion reset transistors further includes a plurality of second diffusion reset transistors coupled between the supply rail and the plurality of second floating diffusions, wherein the plurality of output reset transistors further includes a plurality of second output reset transistors coupled between the supply rail and the plurality of second source follower transistors.

28. The time-of-flight sensing system of claim 27, wherein a first one of the plurality of photodiodes is coupled to the first one of the plurality of first floating diffusions through a first one of the plurality of first transfer transistors and to the first one of the plurality of second floating diffusions through a first one of the plurality of second transfer transistors, wherein a second one of the plurality of photodiodes is coupled to the second one of the plurality of first floating diffusions through a second one of the plurality of first transfer transistors and to the second one of the plurality of second floating diffusions through a second one of the plurality of second transfer transistors.

29. The time-of-flight sensing system of claim 28, wherein the first one of the plurality of first sample and hold transistors and the second one of the plurality of first sample and hold transistors are configured to be turned ON simultaneously to sample and hold the first portion of the charge from the first one of the plurality of photodiodes in the first one of the plurality of first memory nodes and to sample and hold the first portion of the charge from the second one of the plurality of photodiodes in the second one of the plurality of first memory nodes, wherein the first one of the plurality of second sample and hold transistors and the second one of the plurality of second sample and hold transistors are configured to be turned ON simultaneously to sample and hold the second portion of the charge from the first one of the plurality of photodiodes in the first one of the plurality of second memory nodes and to sample and hold the second portion of the charge from the second one of the plurality of photodiodes in the second one of the plurality of second memory nodes.

30. The time-of-flight sensing system of claim 29, wherein the first one of the plurality of first readout transistors and the second one of the plurality of first readout transistors are configured to be turned ON simultaneously to perform a first binned readout of the first portion of the charge from the first one of the plurality of photodiodes and the second one of the plurality of photodiodes through the first bitline, wherein the first one of the plurality of second readout transistors and the second one of the plurality of second readout transistors are configured to be turned ON simultaneously to perform a second binned readout of the first portion of the charge from the first one of the plurality of photodiodes and the second one of the plurality of photodiodes through the second bitline, wherein the first one of the plurality of first sample and hold transistors, the second one of the plurality of first sample and hold transistors, the first one of the plurality of second sample and hold transistors, and the second one of the plurality of second sample and hold transistors are configured to be turned ON simultaneously prior to the first one of the plurality of first readout transistors and the second one of the plurality of first readout transistors being turned ON simultaneously, and prior to the first one of the plurality of second readout transistors and the second one of the plurality of second readout transistors being turned ON simultaneously.

31. The time-of-flight sensing system of claim 29, wherein the first one of the plurality of first readout transistors is configured to be turned ON and OFF to perform a first non-binned readout of the first portion of the charge from the first one of the plurality of photodiodes through the first bitline, wherein the second one of the plurality of first readout transistors is configured to be turned ON and OFF to perform a second non-binned readout of the first portion of the charge from the second one of the plurality of photodiodes through the first bitline, wherein the first one of the plurality of second readout transistors is configured to be turned ON and OFF to perform a first non-binned readout of the second portion of the charge from the first one of the plurality of photodiodes through the second bitline, wherein the second one of the plurality of second readout transistors is configured to be turned ON and OFF to perform a second non-binned readout of the second portion of the charge from the second one of the plurality of photodiodes through the second bitline, wherein the first one of the plurality of first readout transistors, the second one of the plurality of first readout transistors, the first one of the plurality of second readout transistors, and the second one of the plurality of second readout transistors are configured to be turned ON and OFF sequentially after the first one of the plurality of first sample and hold transistors, the second one of the plurality of first sample and hold transistors, the first one of the plurality of second sample and hold transistors, and the second one of the plurality of second sample and hold transistors are configured to be turned ON simultaneously.

32. The time-of-flight sensing system of claim 29,
wherein the first one of the plurality of first sample and hold transistors and the second one of the plurality of first sample and hold transistors are configured to be turned ON simultaneously while the first one of the plurality of second sample and hold transistors and the second one of the plurality of second sample and hold transistors are configured to be turned OFF simultaneously,
wherein the first one of the plurality of second sample and hold transistors and the second one of the plurality of second sample and hold transistors are configured to be turned ON simultaneously while the first one of the plurality of first sample and hold transistors and the second one of the plurality of first sample and hold transistors are configured to be turned OFF simultaneously.

33. The time-of-flight sensing system of claim 32,
wherein the first one of the plurality of first readout transistors is configured to be turned ON and OFF to perform a first non-binned readout of the first portion of the charge from the first one of the plurality of photodiodes through the first bitline,
wherein the second one of the plurality of first readout transistors is configured to be turned ON and OFF to perform a second non-binned readout of the first portion of the charge from the second one of the plurality of photodiodes through the first bitline,
wherein the first one of the plurality of first readout transistors and the second one of the plurality of first readout transistors are configured to be turned ON and OFF sequentially while the first one of the plurality of second sample and hold transistors and the second one of the plurality of second sample and hold transistors are configured to be turned ON simultaneously,
wherein the first one of the plurality of second readout transistors is configured to be turned ON and OFF to perform a first non-binned readout of the second portion of the charge from the first one of the plurality of photodiodes through the second bitline,
wherein the second one of the plurality of second readout transistors is configured to be turned ON and OFF to perform a second non-binned readout of the second portion of the charge from the second one of the plurality of photodiodes through the second bitline,
wherein the first one of the plurality of second readout transistors and the second one of the plurality of second readout transistors are configured to be turned ON and OFF sequentially while the first one of the plurality of first sample and hold transistors and the second one of the plurality of first sample and hold transistors are configured to be turned ON simultaneously.

34. The time-of-flight sensing system of claim 32,
wherein the first one of the plurality of first readout transistors and the second one of the plurality of first readout transistors are configured to be turned ON simultaneously to perform a first binned readout of the first portion of the charge from the first one of the plurality of photodiodes and the second one of the plurality of photodiodes through the first bitline,
wherein the first one of the plurality of first readout transistors and the second one of the plurality of first readout transistors are configured to be turned ON simultaneously while the first one of the plurality of second sample and hold transistors and the second one of the plurality of second sample and hold transistors are configured to be turned ON simultaneously,
wherein the first one of the plurality of second readout transistors and the second one of the plurality of second readout transistors are configured to be turned ON simultaneously to perform a second binned readout of the first portion of the charge from the first one of the plurality of photodiodes and the second one of the plurality of photodiodes through the second bitline,
wherein the first one of the plurality of second readout transistors and the second one of the plurality of second readout transistors are configured to be turned ON simultaneously while the first one of the plurality of first sample and hold transistors and the second one of the plurality of first sample and hold transistors are configured to be turned ON simultaneously.

35. The time-of-flight sensing system of claim 28,
wherein the first one of the plurality of first binning transistors and the first one of the plurality of second binning transistors are configured to be turned ON simultaneously to couple the first one of the plurality of first floating diffusions to the second one of the plurality of first floating diffusions and to coupled the first one of the plurality of second floating diffusions to the second one of the plurality of second floating diffusions.

36. The time-of-flight sensing system of claim 35,
wherein the first one of the plurality of first sample and hold transistors and the first one of the plurality of second sample and hold transistors are configured to be turned ON simultaneously to sample and hold the first portion of the charge from the first one of the plurality of photodiodes in the first one of the plurality of first memory nodes and to sample and hold the second portion of the charge from the first one of the plurality of photodiodes in the first one of the plurality of second memory nodes,
wherein the second one of the plurality of first sample and hold transistors and the second one of the plurality of second sample and hold transistors are configured to be turned ON simultaneously to sample and hold the first portion of the charge from the first one of the plurality of photodiodes in the second one of the plurality of first memory nodes and to sample and hold the second portion of the charge from the second one of the plurality of photodiodes in the second one of the plurality of second memory nodes,
wherein the first one of the plurality of first sample and hold transistors and the first one of the plurality of second sample and hold transistors are configured to be turned ON simultaneously while the second one of the plurality of first sample and hold transistors and the second one of the plurality of second sample and hold transistors are configured to be turned OFF simultaneously,
wherein the second one of the plurality of first sample and hold transistors and the second one of the plurality of second sample and hold transistors are configured to be turned ON simultaneously while the first one of the plurality of first sample and hold transistors and the first one of the plurality of second sample and hold transistors are configured to be turned OFF simultaneously.

37. The time-of-flight sensing system of claim 36,
wherein the first one of the plurality of first readout transistors and the first one of the plurality of second readout transistors are configured to be turned ON simultaneously to perform a first binned readout of the first portion of the charge from the first one of the plurality of photodiodes and the second one of the plurality of photodiodes through the first bitline and a first binned readout of the second portion of the charge from the first one of the plurality of photodiodes and the second one of the plurality of photodiodes through the second bitline while the second one of the plurality of first sample and hold transistors and the second one of the plurality of second sample and hold transistors are configured to be turned ON simultaneously,
wherein the second one of the plurality of first readout transistors and the second one of the plurality of second readout transistors are configured to be turned ON simultaneously to perform a second binned readout of the first portion of the charge from the first one of the plurality of photodiodes and the second one of the plurality of photodiodes through the first bitline and a second binned readout of the second portion of the charge from the first one of the plurality of photodiodes and the second one of the plurality of photodiodes through the second bitline while the first one of the plurality of first sample and hold transistors and the first one of the plurality of second sample and hold transistors are configured to be turned ON simultaneously.

38. The time-of-flight sensing system of claim 28,
wherein a third one of the plurality of photodiodes is coupled to a third one of the plurality of first floating diffusions through a third one of the plurality of first transfer transistors and to a third one of the plurality of second floating diffusions through a third one of the plurality of second transfer transistors,
wherein a fourth one of the plurality of photodiodes is coupled to a fourth one of the plurality of first floating diffusions through a fourth one of the plurality of first transfer transistors and to a fourth one of the plurality of second floating diffusions through a fourth one of the plurality of second transfer transistors,
wherein a second one of the plurality of first binning transistors is coupled between the third one of the plurality of first floating diffusions and the fourth one of the plurality of first floating diffusions,
wherein a second one of the plurality of second binning transistors is coupled between the third one of the plurality of second floating diffusions and the fourth one of the plurality of second floating diffusions.

39. The time-of-flight sensing system of claim 38,
wherein a third one of the plurality of first memory nodes is coupled to the third one of the plurality of first floating diffusions through a third one of the plurality of first sample and hold transistors,
wherein a fourth one of the plurality of first memory nodes is coupled to the fourth one of the plurality of first floating diffusions through a fourth one of the plurality of first sample and hold transistors,
wherein a third one of the plurality of second memory nodes is coupled to the third one of the plurality of second floating diffusions through a third one of the plurality of second sample and hold transistors,
wherein a fourth one of the plurality of second memory nodes is coupled to the fourth one of the plurality of second floating diffusions through a fourth one of the plurality of second sample and hold transistors.

40. The time-of-flight sensing system of claim 39,
wherein a gate of a second one of the plurality of first source follower transistors is coupled to the third one of the plurality of first memory nodes through a third one of the plurality of first readout transistors, wherein the gate of the second one of the plurality of first source follower transistors is coupled to the fourth one of the plurality of first memory nodes through a fourth one of the plurality of first readout transistors,
wherein a gate of a second one of the plurality of second source follower transistors is coupled to the third one of the plurality of second memory nodes through a third one of the plurality of second readout transistors, wherein the gate of the second one of the plurality of second source follower transistors is coupled to the fourth one of the plurality of second memory nodes through a fourth one of the plurality of second readout transistors,
wherein a second one of the plurality of first row select transistors is coupled between the second one of the plurality of first source follower transistors and a third bitline,
wherein a second one of the plurality of second row select transistors is coupled between the second one of the plurality of second source follower transistors and a fourth bitline.

41. The time-of-flight sensing system of claim 40, wherein the first one of the plurality of photodiodes and the third one of the plurality of photodiodes are capable of being configured to be binned in response to coupling the first bitline to the third bitline and coupling the second bitline to the fourth bitline.

42. The time-of-flight sensing system of claim 41, wherein the first and second ones of the plurality of photodiodes and the third and fourth ones of the plurality of photodiodes are capable of being configured to be binned in response to coupling the first bitline to the third bitline and coupling the second bitline to the fourth bitline.

* * * * *